(12) United States Patent
Koyama et al.

(10) Patent No.: US 7,471,188 B2
(45) Date of Patent: Dec. 30, 2008

(54) SEMICONDUCTOR DEVICE AND DRIVING METHOD THEREOF

(75) Inventors: Jun Koyama, Kanagawa (JP); Toshihiko Saito, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 483 days.

(21) Appl. No.: 11/003,118

(22) Filed: Dec. 3, 2004

(65) Prior Publication Data

US 2005/0134435 A1      Jun. 23, 2005

(30) Foreign Application Priority Data

Dec. 19, 2003   (JP)   .............................. 2003-423560

(51) Int. Cl.
*H04Q 5/22*   (2006.01)
(52) U.S. Cl. ................ 340/10.1; 340/572.1; 340/539.1; 340/572.4; 340/572.7
(58) Field of Classification Search ............. 340/572.1, 340/539.1, 572.4, 572.7
See application file for complete search history.

(56) References Cited

U.S. PATENT DOCUMENTS

| | | | |
|---|---|---|---|
| 6,229,443 B1 * | 5/2001 | Roesner | 340/572.1 |
| 6,321,067 B1 | 11/2001 | Suga et al. | |
| 6,427,065 B1 | 7/2002 | Suga et al. | |
| 7,158,031 B2 * | 1/2007 | Tuttle | 340/572.1 |
| 2003/0016133 A1 * | 1/2003 | Egbert | 340/572.7 |

FOREIGN PATENT DOCUMENTS

JP      2000-299440      10/2000

* cited by examiner

*Primary Examiner*—George A Bugg
*Assistant Examiner*—Travis R Hunnings
(74) *Attorney, Agent, or Firm*—Cook Alex Ltd.

(57) ABSTRACT

There has been a problem in battryless RFID chips that a high voltage AC signal is generated when an antenna is exposed to a high electromagnetic field, and a DC voltage that is obtained through rectification of the AC signal becomes a high voltage accordingly. As a result, heat generation of a logic circuit and a clock generator circuit or element break down occur. The invention takes the following measures: a DC voltage generated through rectification of an AC signal is compared with a reference voltage in a comparator circuit, and a switch element is turned ON when the DC voltage becomes higher so as to add capacitance to an antenna circuit. Accordingly, resonance point of an antenna changes which in turn attenuates an AC signal generated in the antenna circuit, thereby suppressing a DC voltage.

69 Claims, 23 Drawing Sheets

(A) ANTENNA INPUT SIGNAL (B) OUTPUT OF A DC POWER SUPPLY

PRIOR ART

SEMICONDUCTOR DEVICE AND DRIVING METHOD THEREOF

BACKGROUND OF THE INVENTION

1. Field of the Invention

The present invention relates generally to a semiconductor device used for an IC card and an RFID (Radio Frequency Identification: contactless automatic identification technique by use of radio frequencies). In particular, the invention relates to a semiconductor device including a contactless IC card and an RFID chip which receive power and data from an external device in a contactless manner and transmit data to the external device, and a driving method thereof.

Note that the RFID chip is used, for example, as a tag. In addition, the IC card is one type of the RFID chip.

2. Description of the Related Art

In recent years, IC chips such as contactless ID chips using radio frequencies, namely those called RFID chips are attracting attentions, and achievement of higher performance thereof is expected. RFID chips have advantages that recoded data can be read out in a contactless manner, batteryless operation is possible and excellent durability, weather resistance and the like are provided.

In addition, the RFID chips can incorporate functional circuits such as a CPU. That is, the RFID chips can incorporate logic circuits for security management and the like as well as functioning as a data recording medium. The RFID chip has various applications such as personal identification, product identification and position measurement.

Conventional RFID chips have a configuration as shown in FIG. 2. An RFID chip 217 shown in FIG. 2 comprises a power supply circuit 214, an input/output circuit 215, an antenna circuit 216, a logic circuit 210, an amplifier 211, a clock generator circuit/decoder 212, a memory 213 and the like. The antenna circuit 216 comprises an antenna wiring 201 and an antenna capacitor 202.

The RFID chip 217 does not have its own power supply, and instead, it operates with power supplied through reception of a radio wave 218 generated by an RF reader/writer 200.

The operation of the RFID chip 217 is described with reference to FIG. 2. When the antenna circuit 216 receives the radio wave 218 from the RF reader/writer 200, it is detected as an input signal by the input/output circuit 215 which comprises a first capacitor 203, first and third diodes 204 and 207, a third capacitor 208, a switch element 209 and the like. The signal is once amplified to have a sufficiently large amplitude by the amplifier 211 before being split into a clock, data and command by the clock generator circuit/decoder 212. The transmitted command is then decoded in the logic circuit 210, thereby data is read from/written to the memory 213.

The data reading is carried out by turning ON/OFF the switch element 209 using an output of the logic circuit 210. Accordingly, impedance of the antenna circuit 216 is changed, which in turn changes reflectivity of the antenna circuit 216. The RF reader/writer 200 reads out data from the RFID chip 217 by monitoring the change in reflectivity of the antenna circuit 216.

Power consumed in each circuit of the RFID chip 217 is supplied by a DC power supply VDD which is generated by detecting and smoothing the radio wave 218 which is received by the antenna circuit 216, in the power supply circuit 214. The power supply circuit 214 comprises the first diode 204, a second diode 205 and a second capacitor 206. The second capacitor 206 has a sufficiently large capacitance value in order to supply power to each circuit.

FIGS. 11A and 11B illustrate an output (B) of a DC power supply outputted from the power supply circuit 214 relatively to an antenna input signal (A) received by the antenna circuit 216. Negative components of the antenna input signal are removed by the first diode 204 and the second diode 205, and only positive components thereof are supplied to each circuit through the second diode 205. The capacitor 206 stores positive components which have passed through the second diode 205, and supplies power when an antenna input signal is negative. Therefore, the VDD has substantially a constant value, and thus the power supply circuit 214 functions as a DC voltage source.

The following Patent Document 1 discloses an example of such circuit.

[Patent Document 1] Japanese Patent Laid-Open 2000-299440

FIG. 3 illustrates an antenna circuit 308 and a power supply circuit 307 which are the partial components of an RFID chip 309. The antenna circuit 308 comprises an antenna wiring 301 and an antenna capacitor 302. The power supply circuit 307 comprises a first capacitor 303, a first diode 304, a second diode 305 and a second capacitor 306.

The RFID chip has a property of an batteryless operation, and it has a mechanism that circuits incorporated in the RFID chip operate with a DC voltage which is generated by receiving a radio wave from an RF reader/writer in the antenna circuit 308 and rectifying it in the power supply circuit 307.

FIG. 12 illustrates a relationship of the intensity of an electromagnetic field (effective value) received by the antenna circuit 308 and the intensity of a DC voltage rectified by the power supply circuit 307. As shown in FIG. 12, the intensity of the DC voltage rectified by the power supply circuit 307 is determined approximately proportionate to the intensity of the original electromagnetic field. Therefore, in the case where the antenna circuit 308 is exposed to a high electromagnetic field, a high AC voltage signal is generated in the antenna circuit 308. As a result, a DC voltage obtained through rectification of the AC voltage in the power supply circuit 307 is also high.

Accordingly, a high voltage is applied to a memory, a clock generator circuit and the like in the logic circuit portion, and in such a case, the logic circuit portion might generate heat. Otherwise, circuit elements thereof might be broken by the high voltage or other problems might arise.

In view of the foregoing problems, it is an object of the invention to prevent generation of a high voltage even when a high electromagnetic field is applied, and thus prevent a heating circuit and element breakdown.

SUMMARY OF THE INVENTION

In order to solve the aforementioned problems, according to the invention, a DC voltage outputted to a power supply circuit is monitored and compared with a reference voltage. When the monitored DC voltage reaches higher than the reference voltage, a capacitor is connected in parallel to an antenna wiring in an antenna circuit in order to change the resonance point of AC voltage in the antenna circuit, and thus attenuate the AC voltage. According to such structure, DC voltage level outputted to the power supply circuit can be decreased.

The invention provides a semiconductor device comprising a converter circuit which converts an AC voltage to a DC voltage through rectification, a logic circuit, a memory, an input/output circuit, an antenna circuit electrically connected to the input/output circuit and the converter circuit, a reference voltage source, a comparator circuit which compares an output voltage of the reference voltage source with an output voltage of the converter circuit, a switch element controlled by the comparator circuit and one end of which is grounded, and a capacitor one end of which is electrically connected to the antenna circuit while the other end of which is electrically connected to an end of the switch element that is not grounded.

The invention provides a semiconductor device comprising a converter circuit which converts an AC voltage to a DC voltage through rectification, a logic circuit, a memory, an input/output circuit, an antenna circuit electrically connected to the input/output circuit and the converter circuit, a plurality of reference voltage sources, a plurality of comparator circuits which compare output voltages of the respective reference voltage sources with an output voltage of the converter circuit, a plurality of switch elements controlled by the respective comparator circuits and one end of each of which is grounded, and a plurality of capacitors one end of each of which is electrically connected to the antenna circuit while the other end thereof is electrically connected to an end of the respective switch elements that is not grounded.

The invention provides a driving method of a semiconductor device comprising a converter circuit which converts an AC voltage to a DC voltage through rectification, a logic circuit, a memory, an input/output circuit, a comparator circuit, a reference voltage source, a switch element, a capacitor, and an antenna circuit electrically connected to the input/output circuit and the converter circuit, an output of the converter circuit and the reference voltage source being electrically connected to the comparator circuit, an output of the comparator circuit being electrically connected to the switch element, one end of the switch element being grounded while the other end thereof being electrically connected to the capacitor, and one end of the capacitor that is not connected to the switch element being electrically connected to the antenna circuit, the method comprising the steps of: comparing the value of a DC voltage which is converted by the converter circuit with the value of a reference voltage in the comparator circuit; and grounding one end of the capacitor by the switch element operated when the value of the DC voltage reaches higher than the reference voltage, which changes the resonance point of AC voltage in the antenna circuit so as to attenuate the AC voltage, thereby decreasing the level of the output voltage of the converter circuit.

The invention provides a driving method of a semiconductor device comprising a converter circuit which converts an AC voltage to a DC voltage through rectification, a logic circuit, a memory, an input/output circuit, a plurality of comparator circuits, a plurality of reference voltage sources, a plurality of switch elements, a plurality of capacitors, and an antenna circuit electrically connected to the input/output circuit and the converter circuit, an output of the converter circuit and the reference voltage sources being electrically connected to the respective comparator circuits, outputs of the comparator circuits being electrically connected to the respective switch elements, one end of the respective switch elements being grounded while the other end thereof being electrically connected to the respective capacitors, and one end of each of the capacitors that is not connected to the respective switch elements being electrically connected to the antenna circuit, the method comprising the steps of: comparing the value of a DC voltage which is converted by the converter circuit with the value of a plurality of reference voltages in the comparator circuits; and grounding one end of one or more of the capacitors by one or more of the switch elements operated when the value of the DC voltage reaches higher than the reference voltage, which changes the resonance point of AC voltage in the antenna circuit so as to attenuate the AC voltage, thereby decreasing the level of the output voltage of the converter circuit.

According to the invention, a semiconductor device and a driving method thereof can be provided without the need of a special process, whereby an element breakdown can be prevented even when a high electromagnetic field is applied. In addition, when a configuration in which a plurality of comparator circuits are disposed is adopted, a standardization circuit can be provided which spuriously standardizes a voltage.

DETAILED DESCRIPTION OF THE INVENTION

Embodiment Mode

Figure 4:
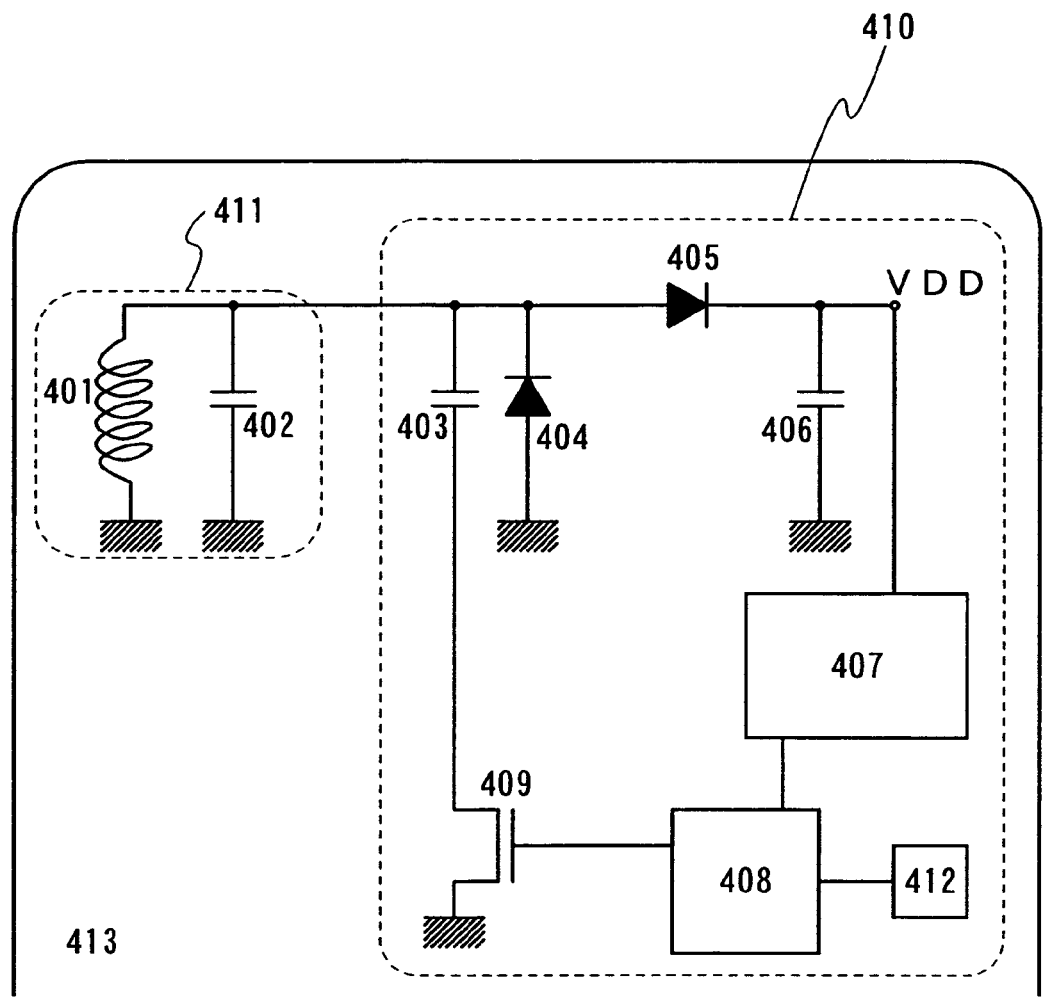
FIG. 4 is a diagram illustrating an embodiment mode of the invention.

Referring to FIG. 4, description is made on an RFID chip 413 of the invention. As shown in FIG. 4, a power supply circuit 410 according to the invention comprises a monitor circuit 407 at VDD outputted to the power supply circuit, a reference voltage source 412, a comparator circuit 408 which compares a DC voltage with a voltage of the reference voltage source 412, a switch element 409 and a first capacitor 403.

The power supply circuit 410 further comprises a first diode 404, a second diode 405 and a second capacitor 406. Note that a circuit comprising the first diode 404, the second diode 405, and the second capacitor means 406 has a function of converting an AC voltage to a DC voltage through rectification. An antenna circuit 411 comprises an antenna wiring 401 and an antenna capacitor 402.

The operation of the RFID chip 413 is described with reference to FIG. 4. When the antenna circuit 411 is exposed to a low electromagnetic field, namely when a generated DC voltage is lower than the voltage level of the reference voltage source 412, the comparator circuit 408 does not operate, and thus the switch element 409 does not operate either.

When the antenna circuit 411 is exposed to a high electromagnetic field, and thus a DC voltage reaches higher than a certain level, the comparator circuit 408 operates to turn ON the switch element 409, thereby one end of the capacitor 403 is grounded. This operation is considered to be equivalent to an increase of capacitance of the antenna circuit 411, and when the tuning point of the antenna circuit 411 changes from an optimal value, signals are attenuated. Accordingly, the level of the generated VDD drops. Thus, even when the antenna circuit 411 is exposed to a high electromagnetic field, voltage level of the VDD can be suppressed, and a logic circuit is prevented from being applied a high voltage. Such an antenna-packaged chip is also referred to as a wireless chip.

Figure 1:
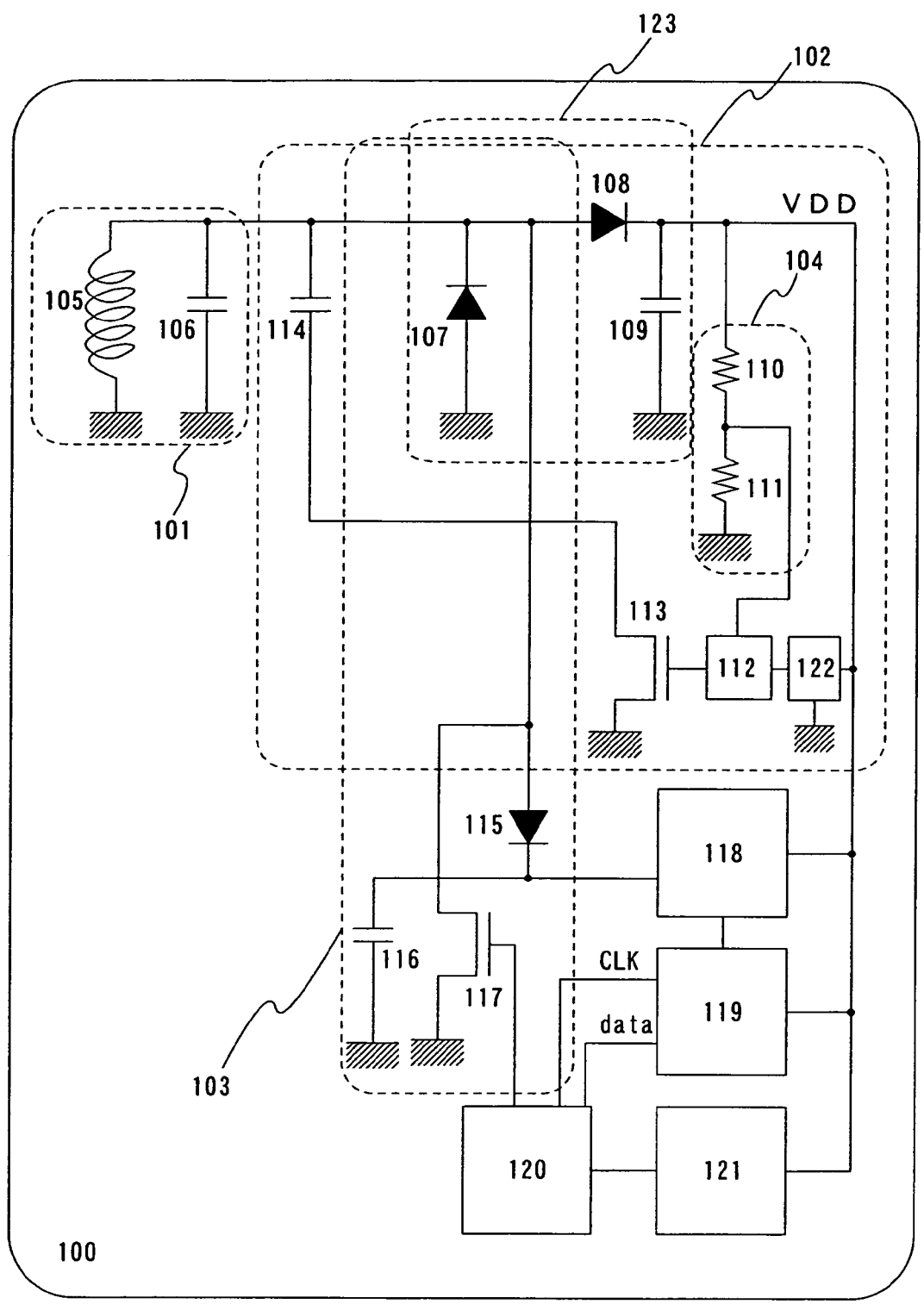
FIG. 1 is a diagram illustrating an embodiment mode of the invention.
Figure 2:
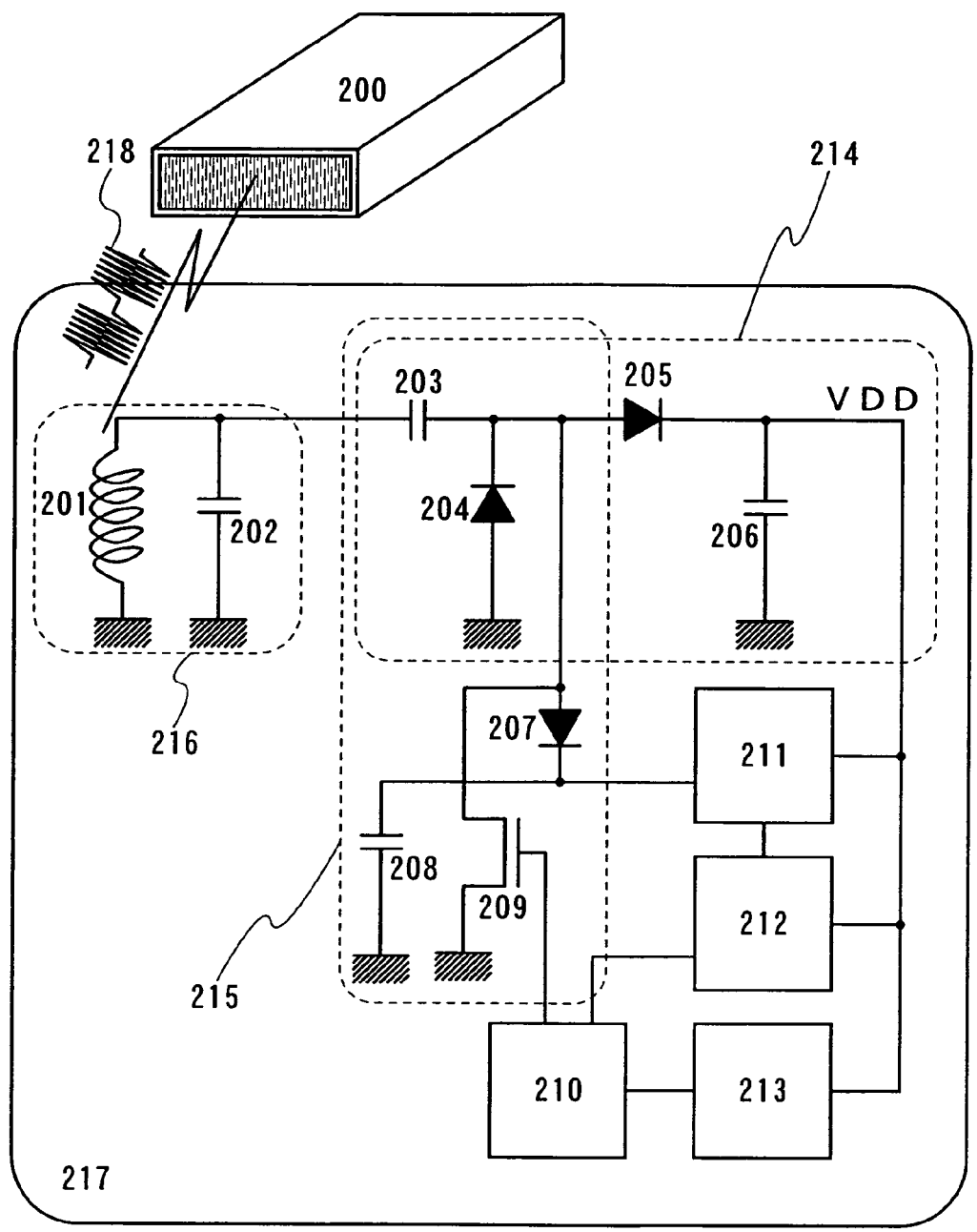
FIG. 2 is a diagram illustrating an example of a conventional RFID chip.
Figure 3:
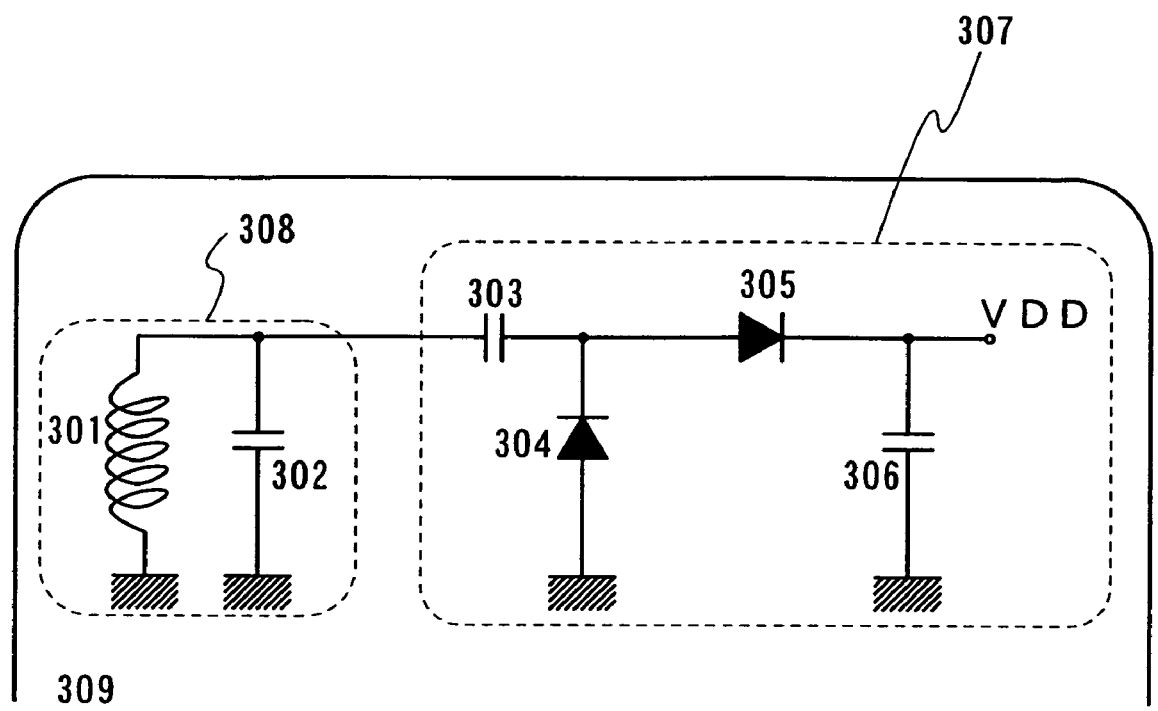
FIG. 3 is a diagram illustrating a power supply circuit of a conventional RFID chip.

The specific structure of the invention is described with reference to FIG. 1. FIG. 1 illustrates an example of an RFID chip of the invention. An RFID chip 100 comprises an antenna circuit 101, a power supply circuit 102, an input/output circuit 103, a converter circuit 123, and the like which are formed on an insulating substrate.

The antenna circuit 101 comprises an antenna wiring 105 and an antenna capacitor 106. The power supply circuit 102 comprises a monitor circuit 104, a first diode 107, a second diode 108, a first capacitor 109, a comparator circuit 112, a first switch element 113 and a second capacitor 114. The input/output circuit 103 comprises the first diode 107 (commonly used in the power supply circuit 102), a third diode 115, a third capacitor 116, a second switch element 117, an amplifier 118, a clock generator circuit/decoder 119, a logic circuit 120, a memory 121 and a reference voltage source 122.

The operation of the RFID chip of the invention is described with reference to FIG. 1. When the antenna circuit 101 receives a radio wave from an RF reader/writer (not shown), it is detected as an output signal by the input/output circuit 103. The signal is once amplified to have a sufficiently large amplitude by the amplifier 118 before being split into a clock, data and command by the clock generator circuit/decoder 119. The transmitted command is decoded in the logic circuit 120, whereby data is read from/written to the memory 121.

The data reading is carried out by turning ON/OFF the second switch element 117 using an output of the input/output circuit 103. Accordingly, impedance of the antenna circuit 101 is changed, which in turn changes reflectivity of the antenna circuit 101. The RF reader/writer reads out data from the RFID chip 100 by monitoring the change in reflectivity of the antenna circuit 101.

Power consumed in each circuit of the RFID chip 100 is supplied by a DC power supply VDD which is generated by detecting and smoothing a radio wave which is received by the antenna circuit 101, in the power supply circuit 102. The converter circuit 123 in the power supply circuit 102 has a function of converting an AC voltage to a DC voltage through rectification. The converter circuit 123 comprises the first diode 107, the second diode 108 and the first capacitor 109. The first capacitor 109 has a sufficiently large capacitance in order to supply power to each circuit.

The voltage VDD of the DC power supply is determined by the intensity of a radio wave from an RF reader/writer. In order to prevent the VDD from reaching higher than a required level due to an extremely high radio wave, which may otherwise cause a heating circuit or an element breakdown, the DC voltage VDD is controlled by using the monitor circuit 104, the comparator circuit 112, the first switch element 113 and the reference voltage source 122.

In FIG. 1, a resistor 110 and a resistor 111 are used as the monitor circuit 104. The VDD outputted from the monitor circuit 104 is compared with a voltage of the reference voltage source 122 in the comparator circuit 112. The reference voltage source 122 may have any configuration, however, it is preferably configured by utilizing the VDD as there is supposedly a limitation in circuit areas due to the properties of the RFID chip in particular. This embodiment mode adopts a circuit configuration which generates a reference voltage using VDD.

Figure 21:
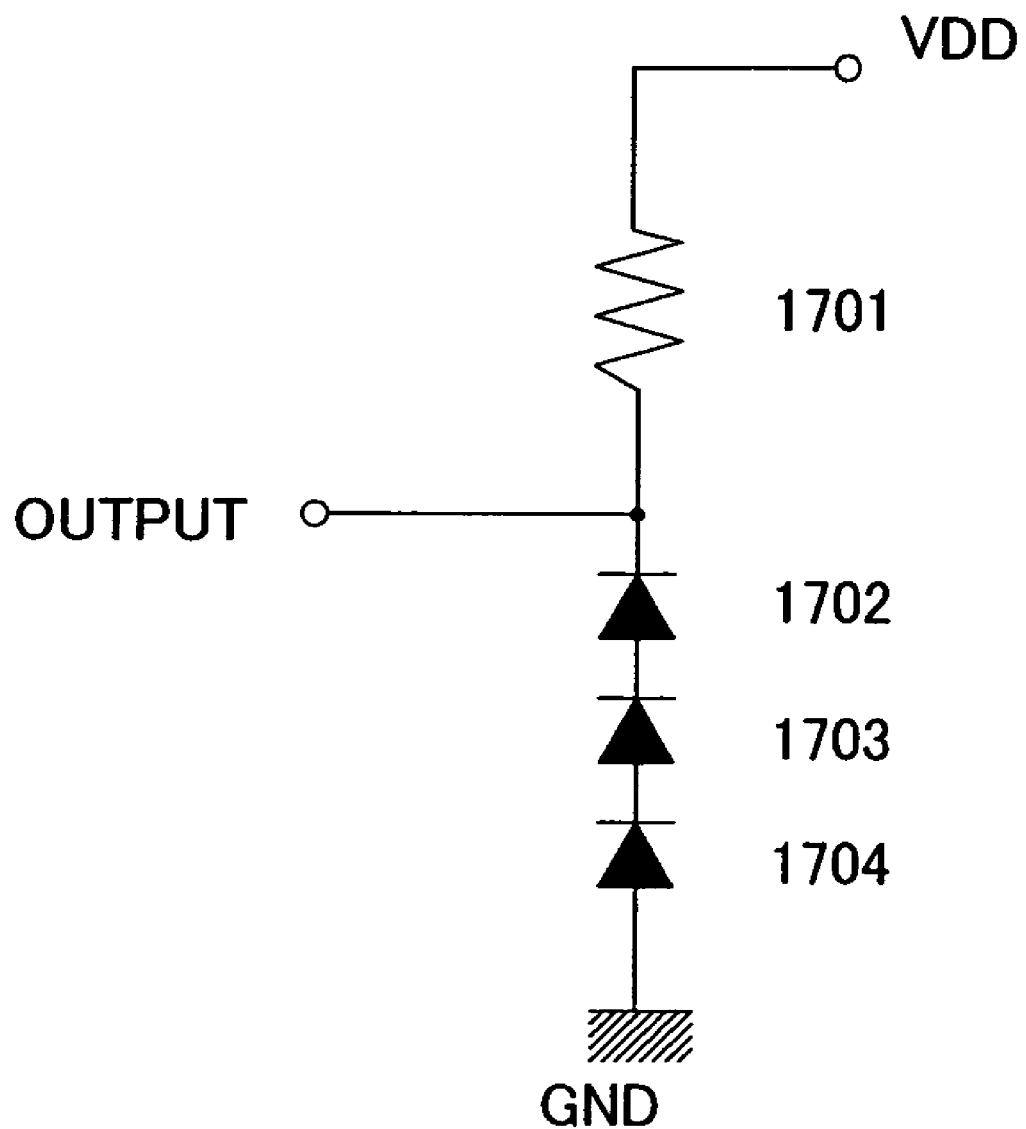
FIG. 21 is a diagram illustrating an example of a reference voltage source of the invention.

FIG. 21 illustrates an exemplary configuration of the reference voltage source 122. The circuit comprises a resistor 1701 and diodes 1702 to 1704. As for the diodes 1702 to 1704, diode-connected TFTs can be employed for example.

In FIG. 21, one end of the resistor 1701 is connected to the VDD while the other end thereof is connected to an OUTPUT (which corresponds to a voltage of the reference voltage source 122 in FIG. 1). The diodes 1702 to 1704 are connected in series. One end of each diode is grounded while the other end thereof is connected to the OUTPUT. According to such configuration, a reference voltage can be generated. The voltage ratio of the OUTPUT and the VDD at this time can be easily determined and changed by the resistor 1701. Needless to say, shown in FIG. 21 is only an example, and the invention is not limited to the circuit configuration and the materials and number of the diodes herein.

In this manner, in the case where a voltage generated in the reference voltage source 122 is compared with an output voltage of the monitor circuit 104 in the comparator circuit 122, and the voltage generated in the reference voltage source 122 is higher, the first switch element is not driven, and the voltage level of the VDD is directly applied to the logic circuit 120 and the like. On the other hand, in the case where the output voltage of the monitor circuit 104 is higher than the voltage generated in the reference voltage source 122, one end of the second capacitor 114 is grounded by driving the first switch element 113 with the output of the comparator circuit 112. This operation is considered to be equivalent to an increase of capacitance of the antenna circuit 101, and when the tuning point of the antenna circuit 101 changes from an optimal value, signals are attenuated. Accordingly, the level of the generated VDD drops. Thus, even when the antenna circuit 101 is exposed to a high electromagnetic field, the voltage level of the VDD can be suppressed, and the logic circuit 120 and the like can be prevented from being applied a high voltage.

Figure 16:
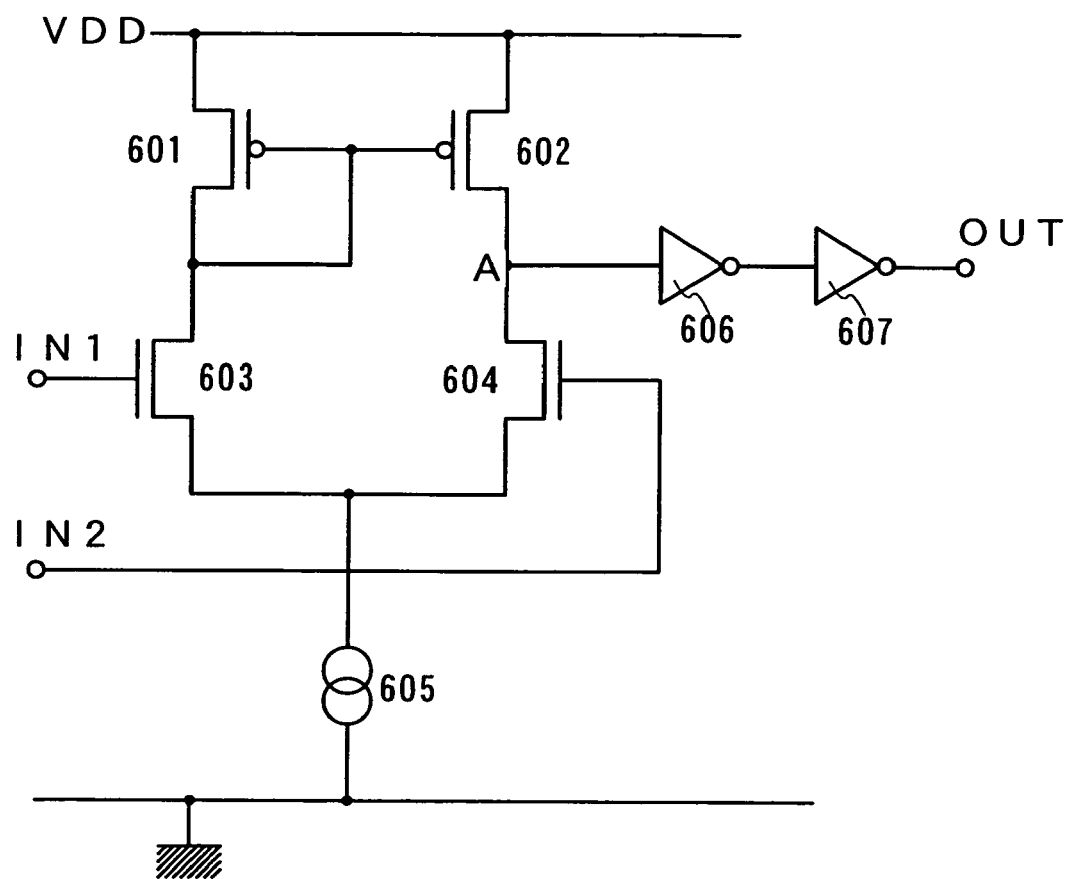
FIG. 16 is a diagram illustrating an example of a comparator circuit of the invention.

The comparator circuit 112 may be a known circuit. FIG. 16 illustrates an example of the comparator circuit 112. The comparator circuit comprises P-channel TFTs 601 and 602, N-channel TFTs 603 and 604, a constant current source 605, and inverters 606 and 607. The comparator circuit has two input terminals IN1 and IN2. The IN1 is connected to the gate of the N-channel TFT 603 while the IN2 is connected to the gate of the N-channel TFT 604. One of the drain and source of the N-channel TFT 603 is connected to the gates of the P-channel TFTs 601 and 602 and to one of the drain and source of the P-channel TFT 601. One of the drain and source of the N-channel TFT 604 (this node is referred to as a node A) is connected to one of the drain and source of the P-channel TFT 602. In addition, the node A is connected to the inverters 606 and 607 connected in series, and corresponds to the output of the comparator circuit. The other of the drain and source of the N-channel TFTs 603 and 604 is each connected to the constant current source 605, and the other of the drain and source of the P-channel TFTs 601 and 602 is each connected to the VDD.

The comparator circuit has the two input terminals IN1 and IN2, and the output of the circuit changes according to the signal voltage of each input terminal. In the case where neither of the IN1 and IN2 cannot turn ON the N-channel TFTs, the node A is in a floating state. In the case where only the IN1 can turn ON the N-channel TFT 603, the constant current source 605 supplies currents to the P-channel TFTs 601 and 602, thereby they are turned ON. Accordingly, the potential of the node A is Hi, and therefore, the output is Hi. On the other hand, in the case where only the IN2 can turn ON the N-channel TFT 604, the current from the constant current source 605 flows through the node A, and thus the potential of the node A is Lo. In the case where both of the input terminals can turn ON the N-channel TFTs, namely when the IN1 can turn ON the N-channel TFT 603 and the IN2 can turn ON the N-channel TFT 604, higher voltage has a priority. For example, when the voltage of the IN1 is higher than that of the IN2, the N-channel TFT 603 is turned ON first, so that the constant current source 605 flows current to the P-channel TFTs 601 and 602, thereby they are turned ON. Accordingly, the potential of the node A is Hi, and therefore, the output is Hi.

By utilizing such operation, an output of the monitor circuit 104 is inputted to the IN1 while a voltage signal from the reference voltage source 122 is inputted to the IN2. At this time, the voltage of the reference voltage source 122 is set high enough to turn ON the N-channel TFT 604 at least. By setting the input in this manner, the output of the comparator circuit is Lo when the voltage of the reference voltage source 122 is higher, and at the point when the output of the monitor circuit 104 becomes higher than the voltage of the reference voltage source 122, the output of the comparator circuit 112 is Hi.

Figure 23:
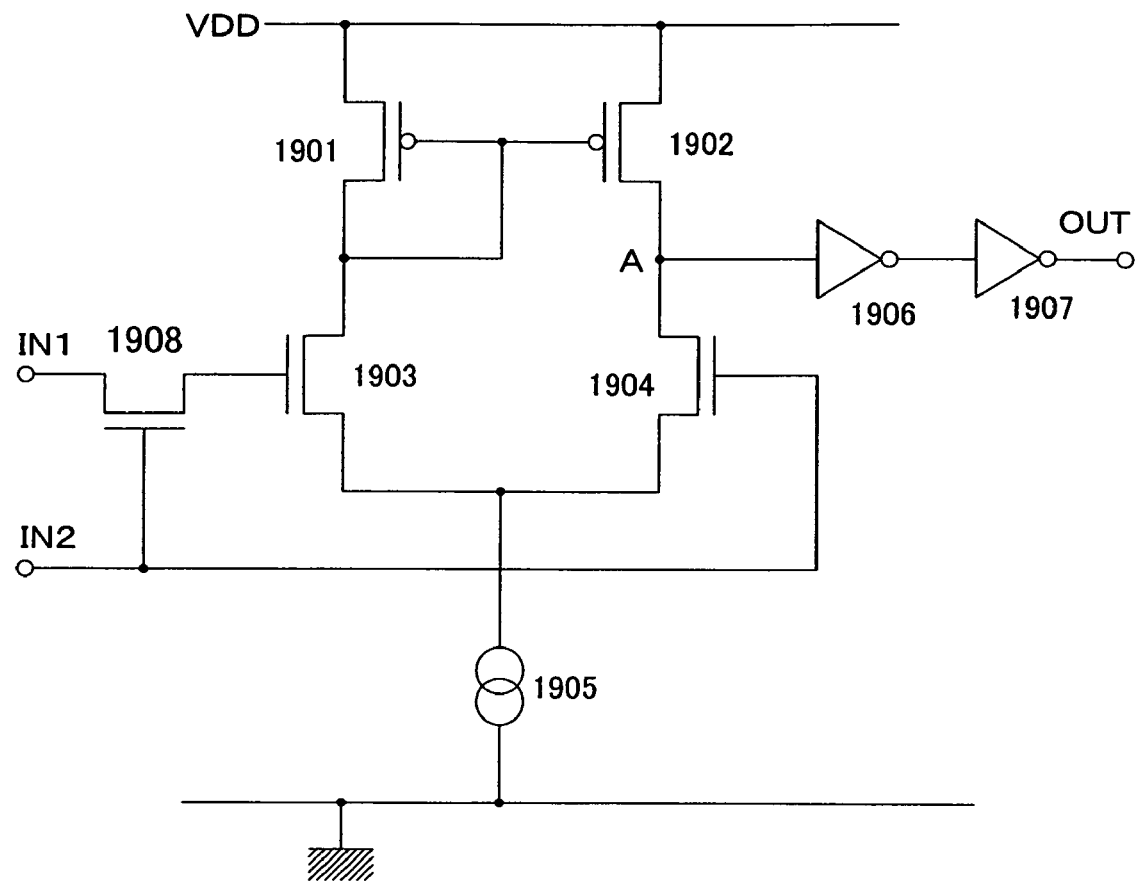
FIG. 23 is a diagram illustrating an example of a comparator circuit of the invention.

Needless to say, the comparator circuit of the invention is not limited to the aforementioned example, and the comparator circuit may have a configuration as shown in FIG. 23, in which the input voltage of the IN2 is higher than that of the IN1 until the output VDD of the monitor circuit 104 becomes higher.

The comparator circuit shown in FIG. 23 comprises P-channel TFTs 1901 and 1902, N-channel TFTs 1903 and 1904, a constant current source 1905, inverters 1906 and 1907 and an N-channel TFT 1908. The comparator circuit has two input terminals IN1 and IN2. The IN1 is connected to one of the drain and source of the N-channel TFT 1908. The other of the drain and source of the N-channel TFT 1908 is connected to the gate of the N-channel TFT 1903. The IN2 is connected to the gates of the N-channel TFT 1904 and the N-channel TFT 1908. One of the drain and source of the N-channel TFT 1903 is connected to the gates of the P-channel TFTs 1901 and 1902 and to one of the drain and source of the P-channel TFT 1901. One of the drain and source of the N-channel TFT 1904 (this node is referred to as a node A) is connected to one of the drain and source of the P-channel TFT 1902. In addition, the node A is connected to the inverters 1906 and 1907 connected in series, and corresponds to the output of the comparator circuit. The other of the drain and source of the N-channel TFTs 1093 and 1904 is each connected to the constant current source 1905, and the other of the drain and source of the P-channel TFTs 1901 and 1902 is each connected to the VDD. The circuit shown in FIG. 23 is configured in such a manner that the input voltage of the IN2 can be higher than that of the IN1 by utilizing the input of the IN1 being decreased by the level of the threshold voltage after passing through the N-channel 1908.

Figure 5:
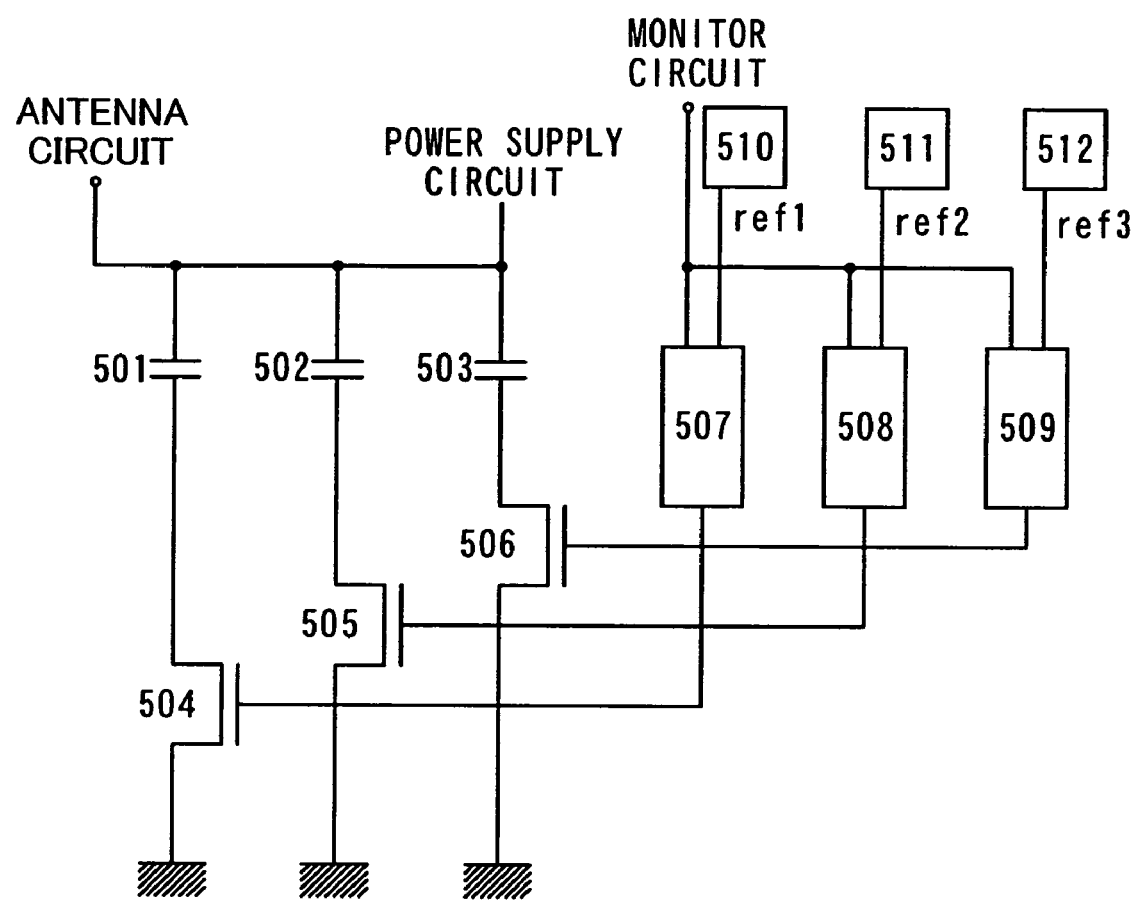
FIG. 5 illustrates a diagram illustrating an example where a plurality of comparator circuits of the invention are disposed.
Figure 6:
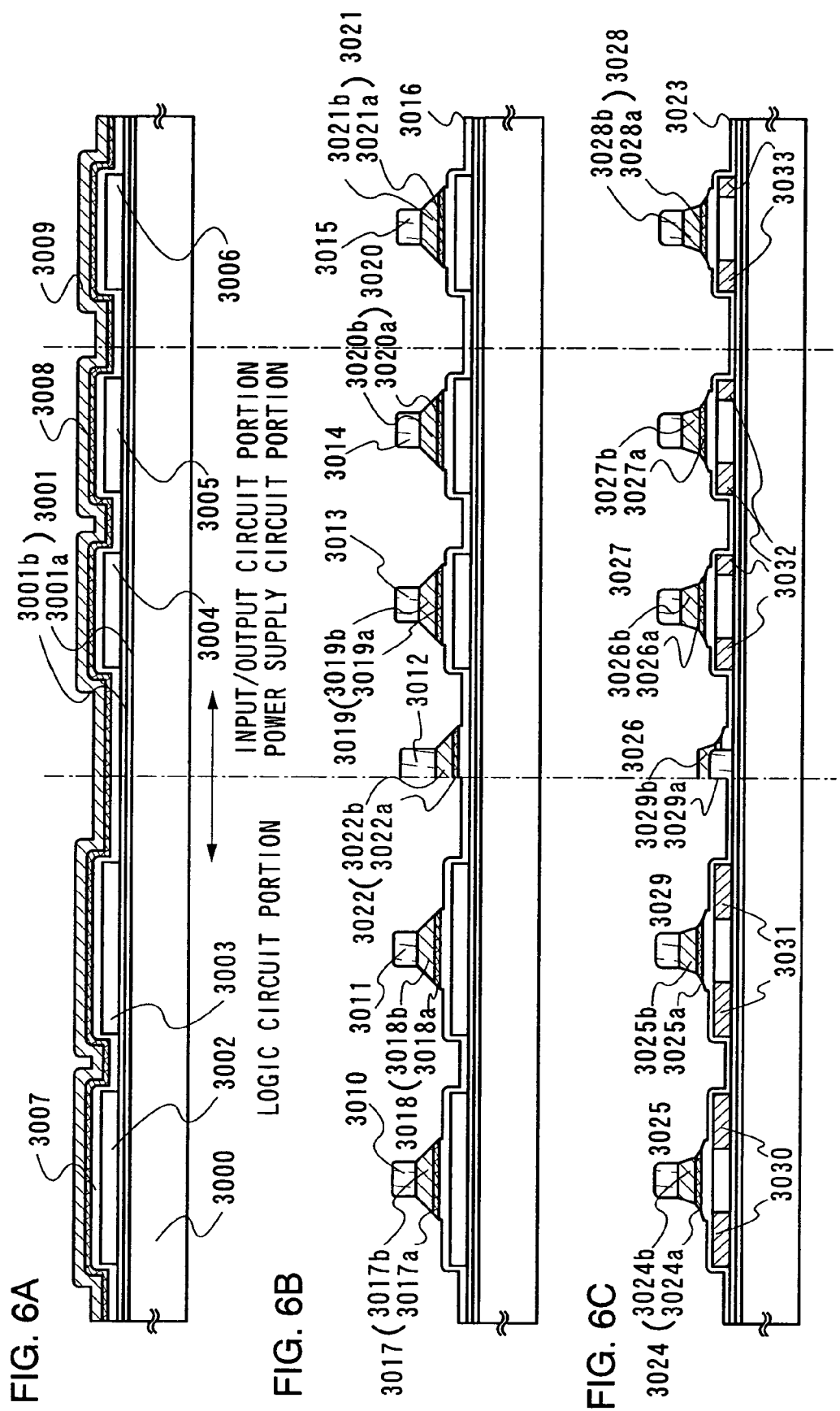
FIGS. 6A to 6C are diagrams illustrating an embodiment (manufacture of TFTs over an insulating substrate) of the invention.
Figure 7:
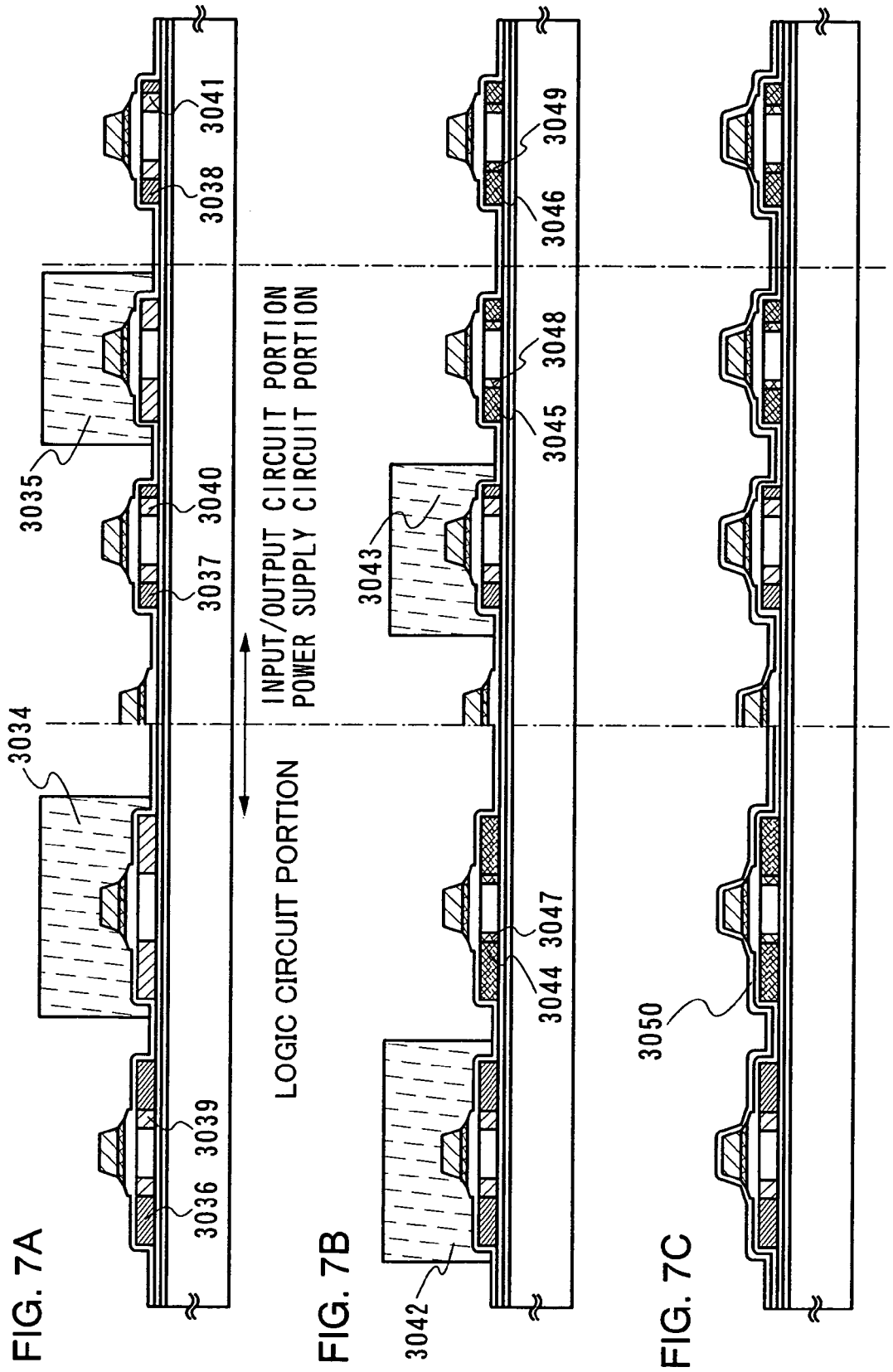
FIGS. 7A to 7C are diagrams illustrating an embodiment (manufacture of TFTs over an insulating substrate) of the invention.

Note that each of the comparator circuit 112 and the reference voltage source 122 is not limited to one type, and a plurality of reference voltage sources may be provided. FIG. 5 illustrates an example where a plurality of comparator circuits and reference voltage sources, namely three different comparator circuits and reference voltage sources are employed.

Based on the DC voltage VDD outputted from the monitor circuit, voltage signals ref1, ref2 and ref3 from three different reference voltage sources 510, 511 and 512 are compared with the output voltage of the monitor circuit in first to third comparator circuits 507, 508 and 509 respectively.

It is assumed that the levels of the ref1, ref2, ref3 from the respective reference voltage sources 510, 511 and 512 are determined to satisfy the relationship: ref1<ref2<ref3. In the case where the output of the monitor circuit is lower than the ref1, neither of the switch elements operates while in the case where the output of the monitor circuit is higher than the ref1 and lower than the ref2, only the first switch 504 operates, whereby capacitance of a first capacitor 501 is effectively added to the antenna circuit. In the case where the output of the monitor circuit is higher than the ref2 and lower than the ref3, the first switch element 504 and the second switch element 505 operate, whereby each capacitance of the first capacitor 501 and a second capacitor 502 is effectively added to the antenna circuit. In the case where the output of the monitor circuit is higher than the ref3, all the switch elements operate, whereby each capacitance of the first capacitor 501, the second capacitor 502 and a third capacitor 503 is effectively added to the antenna circuit.

In this manner, the use of a plurality of reference voltage sources and comparator circuits is preferable and effective in increasing capacitance in stages according to the intensity of a radio wave received by an antenna circuit. Depending on the number of the reference voltage sources, the output voltage can be spuriously standardized to a certain level.

By integrally forming such circuits on the same substrate, a circuit having a function of an RFID chip can be provided. Note that the substrate used for the RFID chip 100 can be formed of any insulating materials. For example, glass, plastics, insulating films, and the like can be employed.

Embodiment 1

Figure 22:
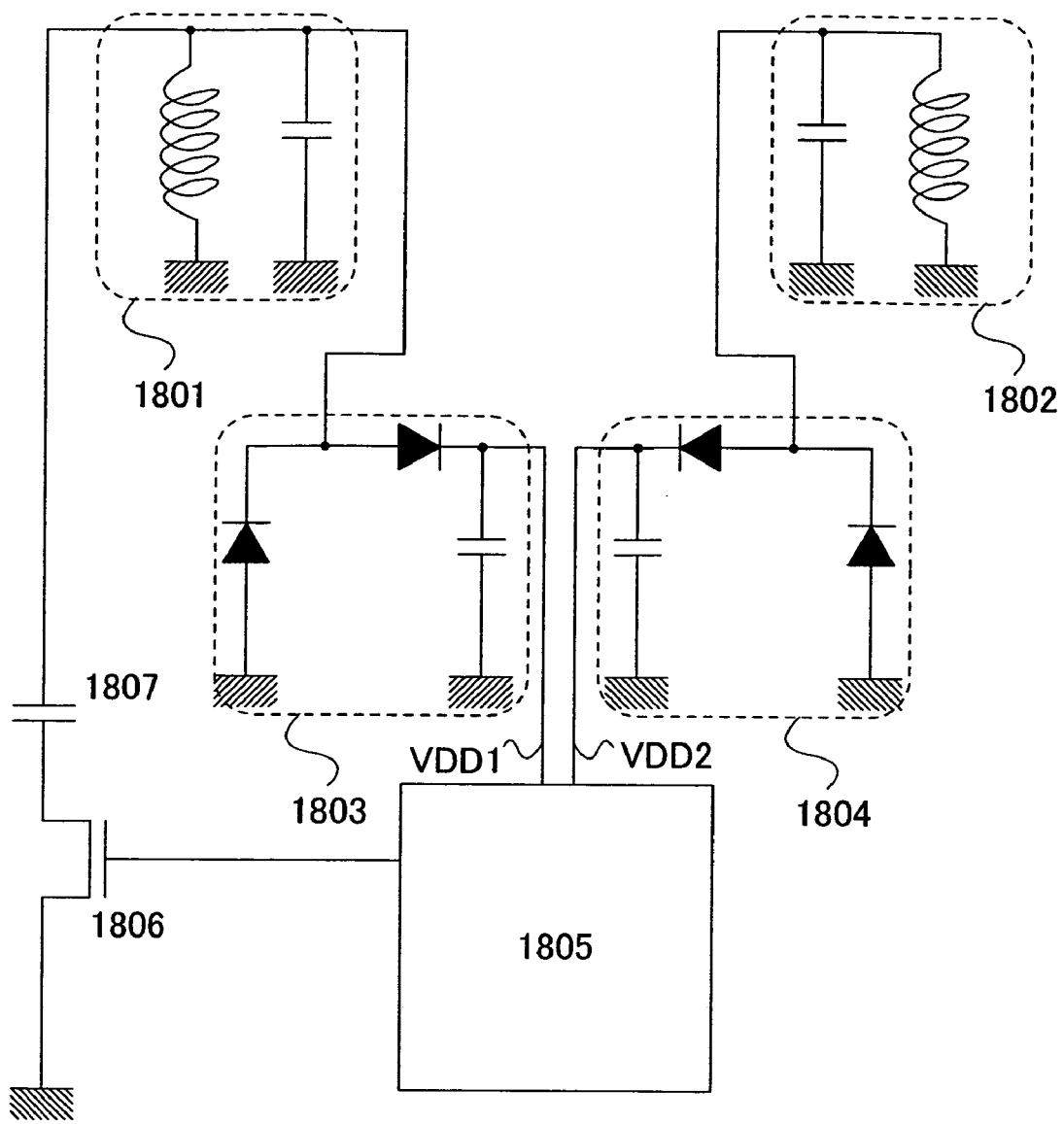
FIG. 22 is a diagram illustrating an embodiment mode of a power supply circuit of the invention.

Referring to FIG. 22, description is made on a power supply circuit portion which has a different mode from the power supply circuit 102 shown in FIG. 1. FIG. 22 illustrates a circuit comprising a first antenna circuit 1801, a second antenna circuit 1802, a first converter circuit 1803, a second converter circuit 1804, a comparator circuit 1805, a switch element 1806 and a capacitor 1807. The second antenna circuit 1802 is configured so as to generate a lower voltage than the voltage generated in the first antenna circuit 1801. For example, the area occupied by an antenna in the second antenna circuit 1802 can be designed smaller than that in the first antenna circuit 1801. Alternatively, the antenna or a capacitor in the second antenna circuit 1802 may have different configurations from that of the first antenna circuit 1801 to obtain a slightly shifted resonance frequency. Though not shown, a monitor circuit as shown in FIG. 1 may be provided between the converter circuits and the comparator circuit.

The operation of the circuit in FIG. 22 is described now. An AC voltage generated in the first antenna circuit 1801 is rectified by the first converter circuit 1803 to be at DC voltage VDD1, while an AC voltage generated in the second antenna circuit 1802 is rectified by the second converter circuit 1804 to be at DC voltage VDD2, both of which are inputted to the comparator circuit 1805. The comparator circuit 1805 compares the VDD1 with VDD2. When the VDD1 is higher, the comparator circuit 1805 outputs Hi to drive the switch element 1806, whereby capacitance of the capacitor 1807 is effectively added to the first antenna circuit 1801, decreasing the potential of the VDD1.

According to such configuration, the relationship of the VDD1 generated in the first converter circuit and the VDD2 generated in the second converter circuit satisfies VDD1>VDD2 at all times. For example, when a circuit as shown in FIG. 23 is employed for the comparator circuit in order to decrease the VDD1 by the level of the threshold voltage, the output of the comparator circuit 1805 can be maintained at Lo so as not to operate the switch element 1806 until the difference between the VDD1 and the VDD 2 reaches the threshold voltage.

According to such configuration, the circuit can be prevented from being applied an extremely high voltage similarly to the example shown in FIG. 1.

Embodiment 2

Description is made now on the method for integrally forming TFTs which are used for the switch elements and diodes shown in embodiment mode over the same insulating substrate with reference to FIGS. 6A to 8. Note that N-channel TFTs and P-channel TFTs are taken as examples of semiconductor elements in this embodiment, however, semiconductor elements of the ID chip of the invention are not limited to them. In addition, the manufacturing method herein described is only an example, and the invention is not limited to such manufacturing method on an insulating substrate.

First, as shown in FIG. 6A, a base film 3001 formed of an insulating film such as a silicon oxide film, a silicon nitride film, a silicon oxynitride film is formed over a substrate 3000 formed of heat-resistant plastic or glass such as barium borosilicate glass and alumino borosilicate glass typified by Corning #7059 or #1737. For example, the base film 3001 has a lamination of a silicon oxynitride film 3001a formed by plasma CVD using $SiH_4$, $NH_3$ and $N_2O$ (thickness of 10 to 200 nm, or preferably 50 to 100 nm) and a hydrogenated silicon oxynitride film 3001b formed by plasma CVD using $SiH_4$ and $N_2O$ (thickness of 50 to 200 nm, or preferably 100 to 150 nm). Although this embodiment shows the example where the base film 3001 has a double-layer structure, it may also have a single-layer structure or multi-layer structure having more than two layers.

Note that the substrate 3000 may be formed of a quartz substrate, a ceramic substrate and the like.

Island-like semiconductor layers 3002 to 3006 are each formed of a crystalline semiconductor film which is formed by crystallizing an amorphous semiconductor film by laser crystallization or known thermal crystallization. Each of the island-like semiconductor layers 3002 to 3006 is formed to have a thickness of 25 to 80 nm (preferably 30 to 60 nm). Materials of the crystalline semiconductor films are not specifically limited, however, silicon or silicon germanium (SiGe) alloys are preferably employed.

In the case of using a crystalline semiconductor film, an amorphous semiconductor film may be crystallized by a known crystallization method. As the known crystallization method, there are various crystallization methods by means of a heating system, laser irradiation, metal catalysts, infrared light and the like.

In the case of forming a crystalline semiconductor film by laser crystallization, a continuous wave or pulsed laser such as an excimer laser, a YAG laser or a $YVO_4$ laser is employed. When using such lasers, it is preferable that laser light radiated from a laser oscillator is linearly condensed by an optical system, and it is then irradiated to a semiconductor film. The crystallization conditions are appropriately determined by a practitioner. In the case of using an excimer laser, crystallization is applied with such conditions: pulse oscillating frequency of 30 Hz and laser energy density of 100 to 400 $mJ/cm^2$ (typically, 200 to 300 $mJ/cm^2$). In the case of using a YAG laser, crystallization is applied using the second harmonic wave with such conditions: pulse oscillating frequency of 1 to 10 kHz and laser energy density of 300 to 600 $mJ/cm^2$ (typically, 350 to 500 $mJ/cm^2$). The whole surface of the substrate is irradiated with laser light which is linearly condensed to a line width of 100 to 1000 μm, for example to 400 μm while setting the superposition rate of the linear beams to 80 to 98%.

Alternatively, crystallization may be applied using a pulsed laser having a pulse oscillating frequency of 10 MHz or more (MHzLC).

Then, a gate insulating film 3007 is formed covering the island-like semiconductor layers 3002 to 3006. The gate insulating film 3007 is formed of a silicon-containing insulating film which is formed to have a thickness of 40 to 150 nm by plasma CVD or sputtering. In this embodiment, a silicon oxynitride film is formed to have a thickness of 120 nm. Needless to say, the gate insulating film is not limited to such silicon oxynitride film, and other silicon-containing insulating films having a single-layer or multi-layer structure may be employed. For example, in the case of using a silicon oxide film, it can be formed by plasma CVD in which a mixture of TEOS (Tetraethyl Orthosilicate) and $O_2$ is discharged with such conditions: reaction pressure of 40 Pa, substrate temperature of 300 to 400° C., RF (13.56 MHz) power and power density of 0.5 to 0.8 $W/cm^2$. A silicon oxide film formed in this manner can obtain an excellent property as a gate insulating film by subsequently being applied with thermal annealing at 400 to 500° C.

Then, a first conductive film 3008 and a second conductive film 3009 for forming a gate electrode are formed over the gate insulating film 3007. In this embodiment, the first conductive film 3008 is formed of Ta to have a thickness of 50 to 100 nm while the second conductive film 3009 is formed of W to have a thickness of 100 to 300 nm.

The Ta film is formed by sputtering a Ta target with an inert gas Ar. In this case, when an appropriate amount of Xe or Kr is added to the Ar gas, internal stress of the Ta film can be alleviated, which can prevent peeling of the film. In addition, the Ta film of the a phase has a resistivity of approximately 20 µOcm and it can thus be used as a gate electrode while the Ta film of the β phase has a resistivity of approximately 180 µO cm and it cannot be suitable for being used as a gate electrode. Formation of a tantalum nitride film having a crystalline structure of a near-a phase of Ta with a thickness of 10 to 50 nm as the base film of the Ta film makes it easier to obtain a Ta film of the a phase.

In the case of forming a W film, sputtering with a W target is employed. Alternatively, thermal CVD by the use of tungsten hexafluoride ($WF_6$) may be employed. In either case, the W film is required to have a lower resistance in order to be used as a gate electrode, and the resistivity of the W film is desirably 20 µOcm or less. The W film can have a lower resistance when the crystal grains thereof are enlarged, however in the case where a number of impurity elements such as oxygen exist in the W film, crystallization is hindered, leading to a higher resistance. Accordingly, in the case of applying sputtering, resistivity of 9 to 20 µOcm can be achieved by using a W target having a purity of 99.9999% and forming a W film with enough attention so as to prevent impurities in the vapor phase from being mixed into the W film.

Note that in this embodiment, Ta and W are employed for the first conductive film 3008 and the second conductive film 3009 respectively, however, the invention is not limited to them, and any element selected from Ta, W, Ti, Mo, Al, Cu and the like, or alloy materials or compound materials containing such element as a main component may be employed. Alternatively, a semiconductor film typified by a polycrystalline silicon film doped with impurity elements such as phosphorous may be employed. As another preferable example of the combination of the first conductive film 3008 and the second conductive film 3009 besides this embodiment mode, such are possible: TaN and W; TaN and Al; TaN and Cu and the like.

In the case where only a small length of LDD is required, a single layer of W may be employed. Alternatively, even with the same structure, the length of the LDD may be shortened by sharpening the taper angle.

Then, resist masks 3010 to 3015 are formed, and the first etching process is applied to form gate electrodes and wirings. In this embodiment, ICP (Inductively Coupled Plasma) etching is employed in which a mixture of $CF_4$ and $Cl_2$ is used as an etching gas and an RF (13.56 MHz) power of 500 W is applied to a coiled electrode at a pressure of 1 Pa to generate plasma. The substrate side (sample stage) is also applied with an RF (13.56 MHz) power of 100 W, and substantially a negative self-biasing voltage is applied thereto. In the case of $CF_4$ and $Cl_2$ being mixed as an etching gas, the W film and the Ta film are etched to the same level.

According to the aforementioned etching conditions, when adopting resist masks each having an appropriate shape, edges of first conductive layers 3017a to 3022a and second conductive layers 3017b to 3022b can each have a tapered shape due to the effect of a biasing voltage applied to the substrate side. Each angle of the tapered portions is 15 to 45°. In order to apply etching without leaving any residue on the gate insulating film, etching time is preferably increased by approximately 10 to 20%. The selective ratio of the silicon oxynitride film relative to the W film is 2 to 4 (typically 3), therefore, the exposed surface of the silicon oxynitride film is etched by approximately 20 to 50 nm by overetching. In this manner, according to the first etching process, first-shape conductive layers 3017 to 3022 (the first conductive layers 3017a to 3022a and the second conductive layers 3017b to 3022b) are formed. At this time, a region 3016 having a reduced thickness by approximately 20 to 50 nm due to etching is formed in the regions of the gate insulating film 3007 which are not covered with the first-shape conductive layers 3017 to 3022.

Subsequently, as shown in FIG. 6C, the second etching process is applied without removing the resist masks 3010 to 3015. The W film is selectively etched using a mixture of $CF_4$, $Cl_2$ and $O_2$ as an etching gas. According to the second etching process, second-shape conductive layers 3024 to 3029 (first conductive layers 3024a to 3029a and second conductive layers 3024b to 3029b) are formed. At this time, a region 3023 having a reduced thickness by approximately 20 to 50 nm due to etching is formed in the regions of the gate insulating film 3007 which are not covered with the second-shape conductive layers 3024 to 3029.

The etching reaction of the W film and the Ta film with a mixed gas of $CF_4$ and $Cl_2$ can be confirmed by the vapor pressure of the produced radicals or ion species and the reaction product. When comparing the vapor pressure of fluoride and chloride of W and Ta, $WF_6$ which is the fluoride of W is extremely higher while $WCl_5$, $TaF_5$ and $TaCl_5$ are approximately equal. Accordingly, the use of the mixed gas of $CF_4$ and $Cl_2$ can etch the W film and the Ta film simultaneously. However, when an appropriate amount of $O_2$ is added to the mixed gas, $CF_4$ reacts with $O_2$ to produce CO and F, thereby F radicals or F ions are produced in large quantities. As a result, the etching rate of the W film having a fluoride of high vapor pressure is increased. On the other hand, as for the Ta film, the etching rate thereof is not increased relatively even when F is increased. In addition, since Ta is more easily oxidized than W, the addition of $O_2$ can oxidize the surface of the Ta film. The oxide of Ta does not react with fluorine or chlorine, therefore, the etching rate of the Ta film is decreased. Accordingly, the etching rate of the W film can be made different from that of the Ta film, and thus the etching rate of the W film can be increased than that of the Ta film.

Then, the first doping process is applied in which impurity elements which impart N-type conductivity are doped. Doping methods can be selected from ion doping or ion implantation. The ion doping is applied with such conditions: dose of $1 \times 10^{13}$ to $5 \times 10^{14}$ atoms/cm$^2$ and accelerating voltage of 60 to 100 keV. As the impurity elements which impart N-type conductivity, group 15 elements typified by phosphorus (P) or arsenic (As) are employed. Here, phosphorus (P) is employed. In this case, the conductive layers 3024 to 3029 serve as the masks against impurity elements which impart N-type conductivity, and first impurity regions 3030 to 3033 are formed in a self-aligning manner. The first impurity regions 3030 to 3033 are doped with impurity elements which impart N-type conductivity in the concentration range of $1 \times 10^{20}$ to $1 \times 10^{21}$ atoms/cm$^3$ (FIG. 6C).

Then, as shown in FIG. 7A, the second doping process is applied while covering the portions to become P-channel TFTs with masks 3034 and 3035. In the second doping process, impurity elements which impart N-type conductivity are doped with the conditions of a smaller dose amount and higher accelerating voltage than those of the first doping process. For example, doping is applied with an accelerating voltage of 70 to 120 keV and a dose of $1 \times 10^{13}$ atoms/cm$^2$. Accordingly, impurity regions 3036, 3037 and 3038 are formed in the first impurity regions 3030, 3032 and 3033 which are formed in the island-like semiconductor layers in FIG. 6C. The second doping is applied using the second-shape conductive layers 3024, 3026 and 3028 as the masks against impurity elements so that the semiconductor layers under the first conductive layers 3024a, 3026a and 3028a which are not covered with the resist masks are certainly doped. In this manner, third impurity regions 3039, 3040 and 3041 are formed. Concentrations of phosphorus (P) doped in the third impurity regions 3039, 3040 and 3041 are slowly graded in accordance with the film thickness of the tapered portions of the first conductive layers 3024a, 3026a and 3028a. Note that in the semiconductor layers overlapping with the tapered edges of the first conductive layers 3024a, 3026a and 3028a, the semiconductor layers have lower concentrations of impurities in the interior portions than in the tapered edges of the first conductive layers 3024a, 3026a and 3028a, however, they are approximately equal.

Then, as shown in FIG. 7B, fourth impurity regions 3044, 3045 and 3046 each having an opposite conductivity to the first conductive layers are formed in the island-like semiconductor layers 3003 and 3005 for forming P-channel TFTs and the inland-like semiconductor layer 3006 for forming a capacitor respectively. The impurity regions are formed in a self-aligning manner using the second-shape conductive layers 3025b, 3027b and 3028b as the masks against impurity elements. At this time, the whole surfaces of the island-like semiconductor layers 3002 and 3004 for forming N-channel TFTs are covered with resist masks 3042 and 3043. Doping is applied using the second-shape conductive layers 3025, 3027 and 3028 as the masks against impurity elements so that the second semiconductor layers under the first conductive layers 3025a, 3027a and 3028a which are not covered with the resist masks are certainly doped. In this manner, fifth impurity regions 3047, 3048 and 3049 are formed. Concentrations of phosphorus (P) doped in the fourth impurity regions 3044, 3045 and 3046 are different from each other. However, each of the regions is applied with ion doping using diborane ($B_2H_6$) so as to have an impurity concentration of $2 \times 10^{20}$ to $2 \times 10^{21}$ atoms/cm$^3$.

According to the aforementioned steps, impurity regions are formed in the respective island-like semiconductor layers. The second-shape conductive layers 3024 to 3027 overlapping with the island-like semiconductor layers function as gate electrodes. In addition, the second-shape conductive layer 3029 functions as an island-like signal line. In addition, the second-shape conductive layer 3028 functions as a capacitor wiring.

After removing the resist masks 3042 and 3043, an activation step is applied to the impurity elements doped in the respective island-like semiconductor layers in order to control conductivity. This step is carried out by thermal annealing using an annealing furnace. Alternatively, laser annealing or rapid thermal annealing (RTA) can be employed. When applying the thermal annealing, thermal treatment is carried out in a nitrogen atmosphere with an oxygen concentration of 1 ppm or less (preferably 0.1 ppm or less) at 400 to 700° C. (typically, 500 to 600° C.). In this embodiment, thermal treatment is applied at 500° C. for 4 hours. However, in the case where wiring materials used for the second-shape conductive layers 3024 to 3029 are sensitive to heat, activation is preferably carried out after the formation of an interlayer insulating film 3050 (whose primary component is silicon) in order to protect the wirings.

Further, thermal treatment is applied in an atmosphere containing 3 to 100% of hydrogen at 300 to 450° C. for 1 to 12 hours in order to hydrogenate the island-like semiconductor layers. This step is the one for eliminating dangling bonds of the semiconductor layers using thermally excited hydrogen.

As another means for hydrogenation, plasma hydrogenation (using hydrogen which is excited by plasma) may be employed.

Then, a silicon oxynitride film as a first interlayer insulating film 3050 is formed to have a thickness of 100 to 200 nm. Then, a second interlayer insulating film 3051 is formed thereover using organic insulating materials such as acrylic. The second interlayer insulating film 3051 can be formed of inorganic materials as well as the organic insulating materials. As for the inorganic materials, inorganic $SiO_2$, $SiO_2$ (PCVD-$SiO_2$) formed by plasma CVD, SOG (Spin on Glass; coating silicon oxide film) and the like can be employed. After the formation of the two interlayer insulating films, an etching step is applied in order to form contact holes.

Figure 8:
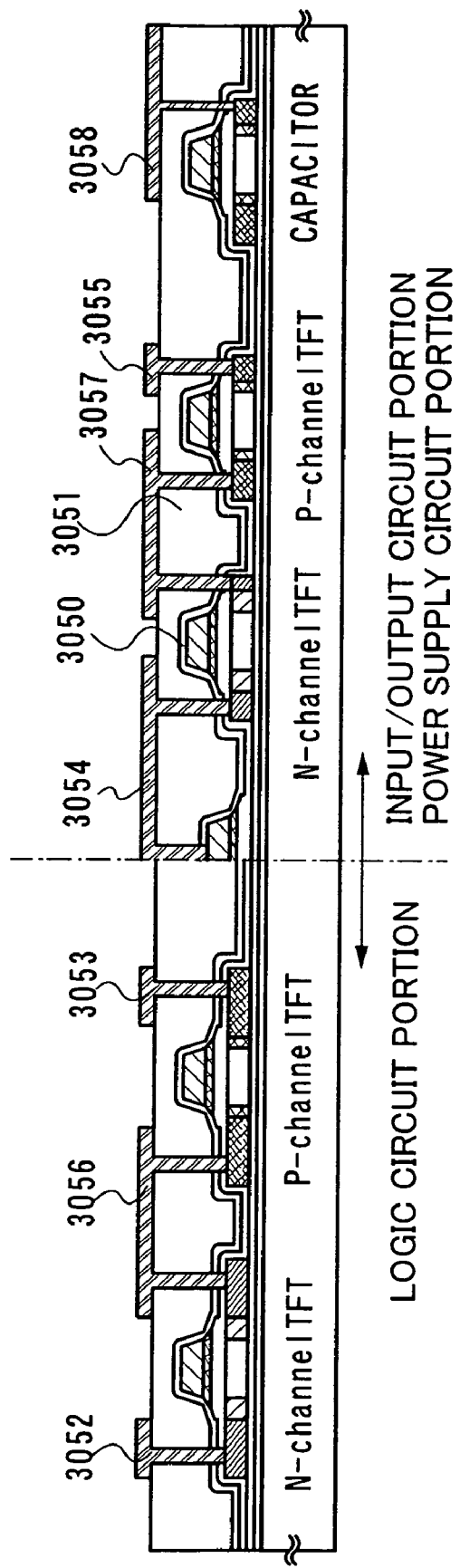
FIG. 8 is a diagram illustrating an embodiment (manufacture of TFTs over an insulating substrate) of the invention.

Then, in the logic circuit portion, source wirings 3052 and 3053 for forming a contact with a source region of each island-like semiconductor layer, and a drain wiring 3056 for forming a contact with a drain region are formed. Similarly, in the input/output circuit portion and the power supply circuit portion, source electrodes 3054 and 3055, a drain electrode 3057 and a connecting electrode 3058 are formed (FIG. 8).

In this manner, the logic circuit portion having an N-channel TFT and a P-channel TFT, and the input/output circuit portion and the power supply portion having an N-channel TFT, a P-channel TFT and a capacitor can be formed over the same substrate.

This embodiment can be appropriately implemented in combination with embodiment mode.

Embodiment 3

In this embodiment, description is made on the manufacturing method which is from the formation of an ID chip up to the transfer thereof to a flexible substrate with reference to FIGS. 9A and 9B and FIGS. 10A and 10B. Note that N-channel TFTs and P-channel TFTs are used as the semiconductor elements in this embodiment, however, the semiconductor elements of the ID chip of the invention are not limited to them. In addition, the manufacturing method on an insulating substrate described herein is only an example, and the invention is not limited to this.

In accordance with the manufacturing steps described in Embodiment 2, steps up to the formation of the first and second interlayer insulating films are completed as shown in FIG. 8. However in this embodiment, a metal oxide film 4021 is formed between the substrate 3000 and the base film 3001. The metal oxide film 4021 may be an oxide of W, TiN, WN, Mo and the like, or an oxide of alloys of such elements. The metal oxide film 4021 is formed quite thin (3 nm here). In addition, the metal oxide film 4021 may be formed through the formation of a metal film on the substrate 3000 and the oxidation of the surface thereof.

By applying thermal treatment to crystallize the metal oxide film 4021, vulnerability thereof is improved. Note that the thermal treatment in the manufacturing steps of the semiconductor elements may be combined with the thermal treatment for improving the vulnerability of the metal oxide film 4021. Specifically, in the case of using tungsten oxide as the metal oxide film 4021, thermal treatment is applied at 420 to 550° C. for about 0.5 to 5 hours.

In the case of using alloys for forming the metal oxide film, an appropriate temperature of the thermal treatment for crystallization varies depending on the composition ratio of the alloys. Thus, by controlling the composition ratio, thermal treatment can be applied at a temperature which does not disturb the manufacturing steps of the semiconductor elements, which can thus provide a wide range of alternatives for the process of semiconductor elements.

Then, a third interlayer insulating film 4030 is formed so as to cover the source/drain wirings 3052 to 3057, and the connecting electrode 3058. Then, contact holes are formed in the third interlayer insulating film 4030, on which pads 4001 and 4002 are formed to be connected to the source wirings 3052 and 3055 respectively.

Figure 9A:
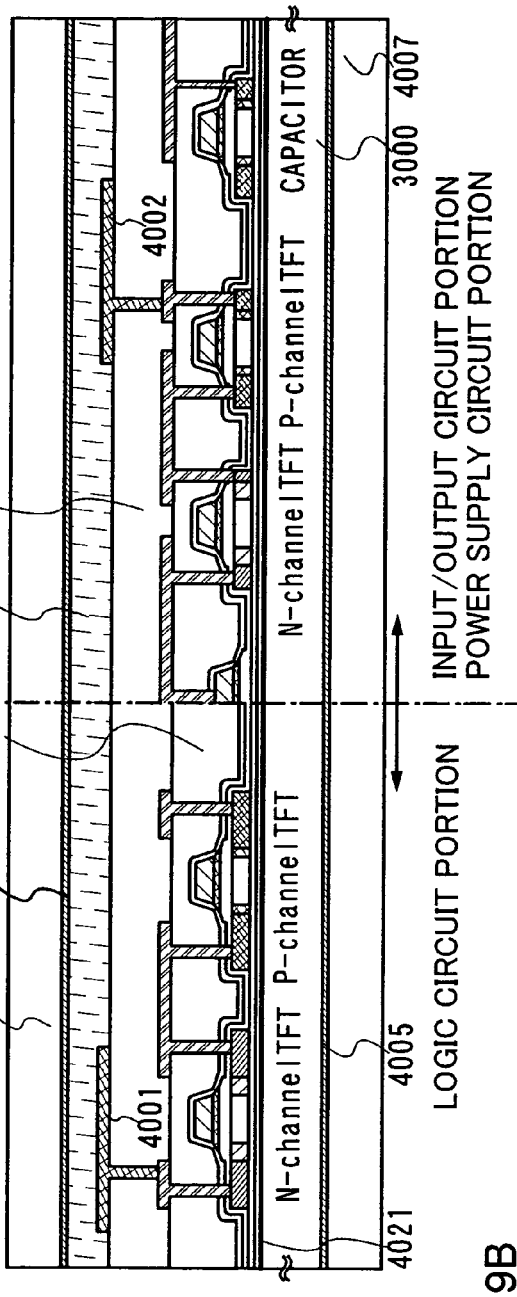
FIGS. 9A and 9B are diagrams illustrating an embodiment (transfer of TFTs to a film substrate) of the invention.

Then, a protective layer 4003 is formed on the third interlayer insulating film 4030 and the pads 4001 and 4002. Then, a second substrate 4006 is attached to the protecting layer 4003 using a double-stick tape 4004 while a third substrate 4007 is attached to the substrate 3000 using a double-stick tape 4005 (FIG. 9A). The third substrate 4007 functions to prevent the substrate 3000 from being damaged in the subsequent peeling step.

Figure 9B:
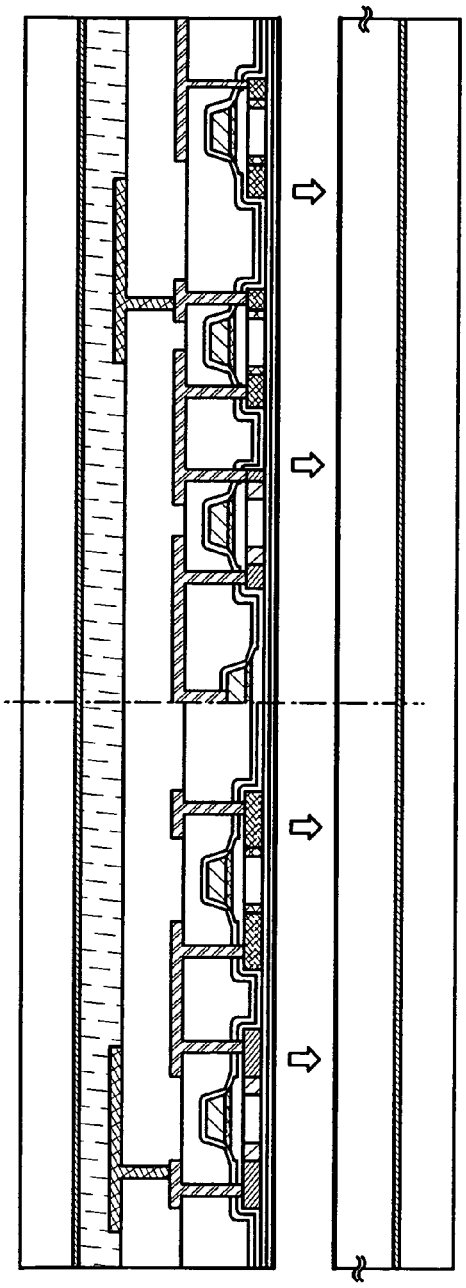
Figure 10A:
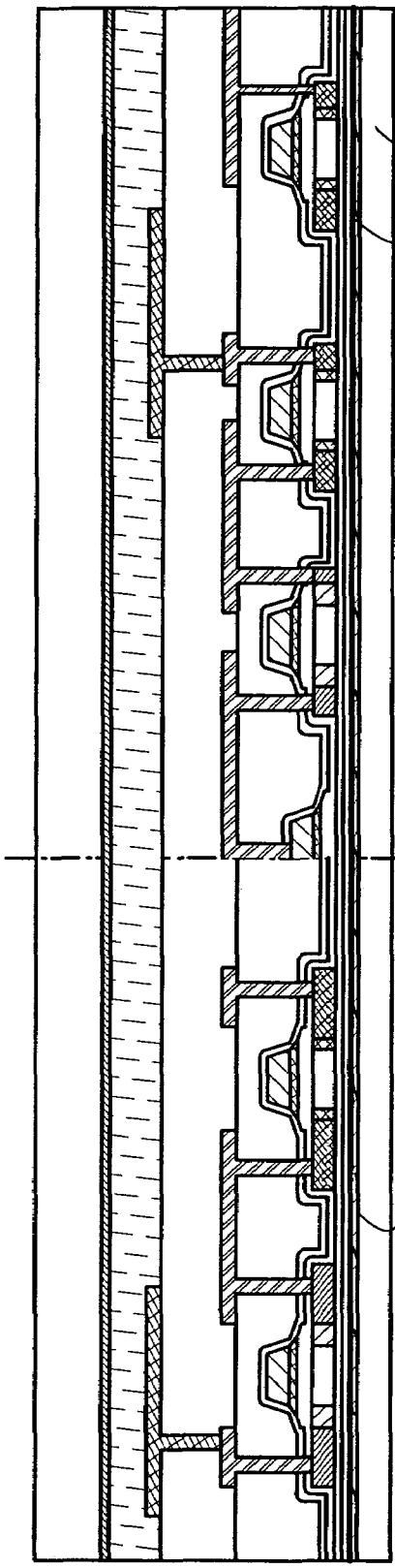
FIGS. 10A and 10B are diagrams illustrating an embodiment (transfer of TFTs to a film substrate) of the invention.

Then, the substrate 3000 is physically peeled off from the metal oxide film 4021. The condition after the peeling is shown in FIG. 9B. After that, a flexible substrate 4009 is attached to the base film 3001 using an adhesive 4008 (FIG. 10A).

Figure 10B:
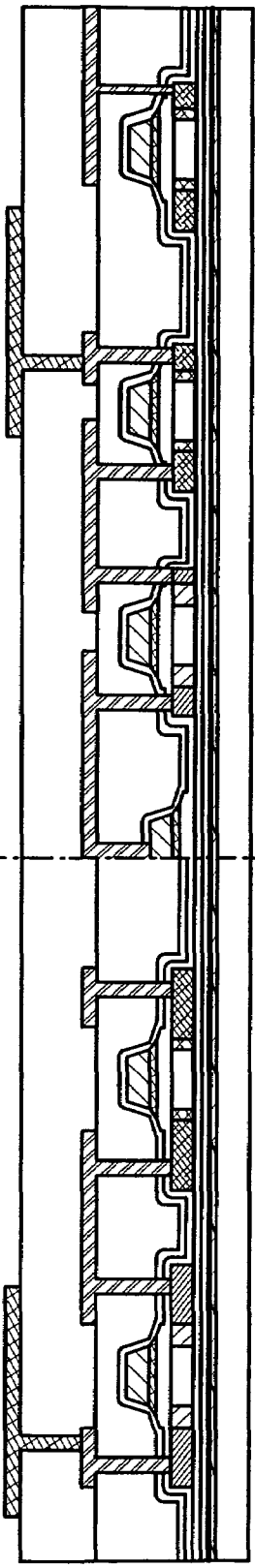
Figure 11A:
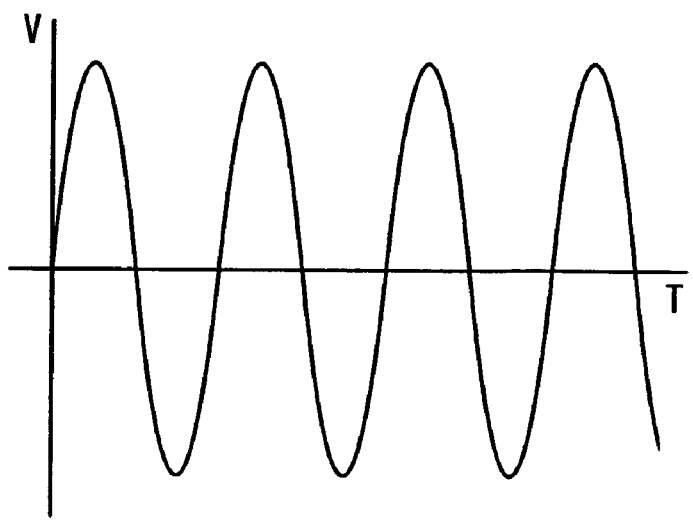
FIGS. 11A and 11B are diagrams each illustrating an output signal of a power supply circuit relatively to an input signal in a conventional RFID chip.
Figure 11B:
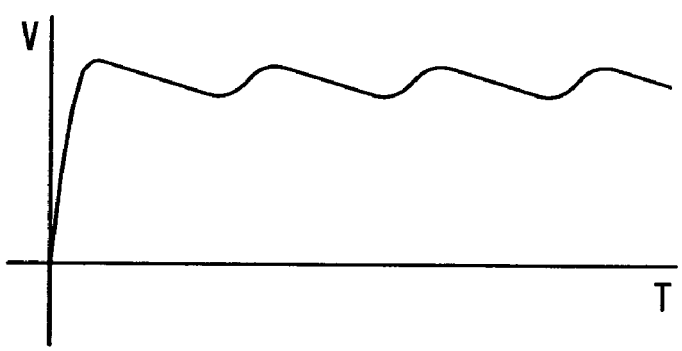
Figure 12:
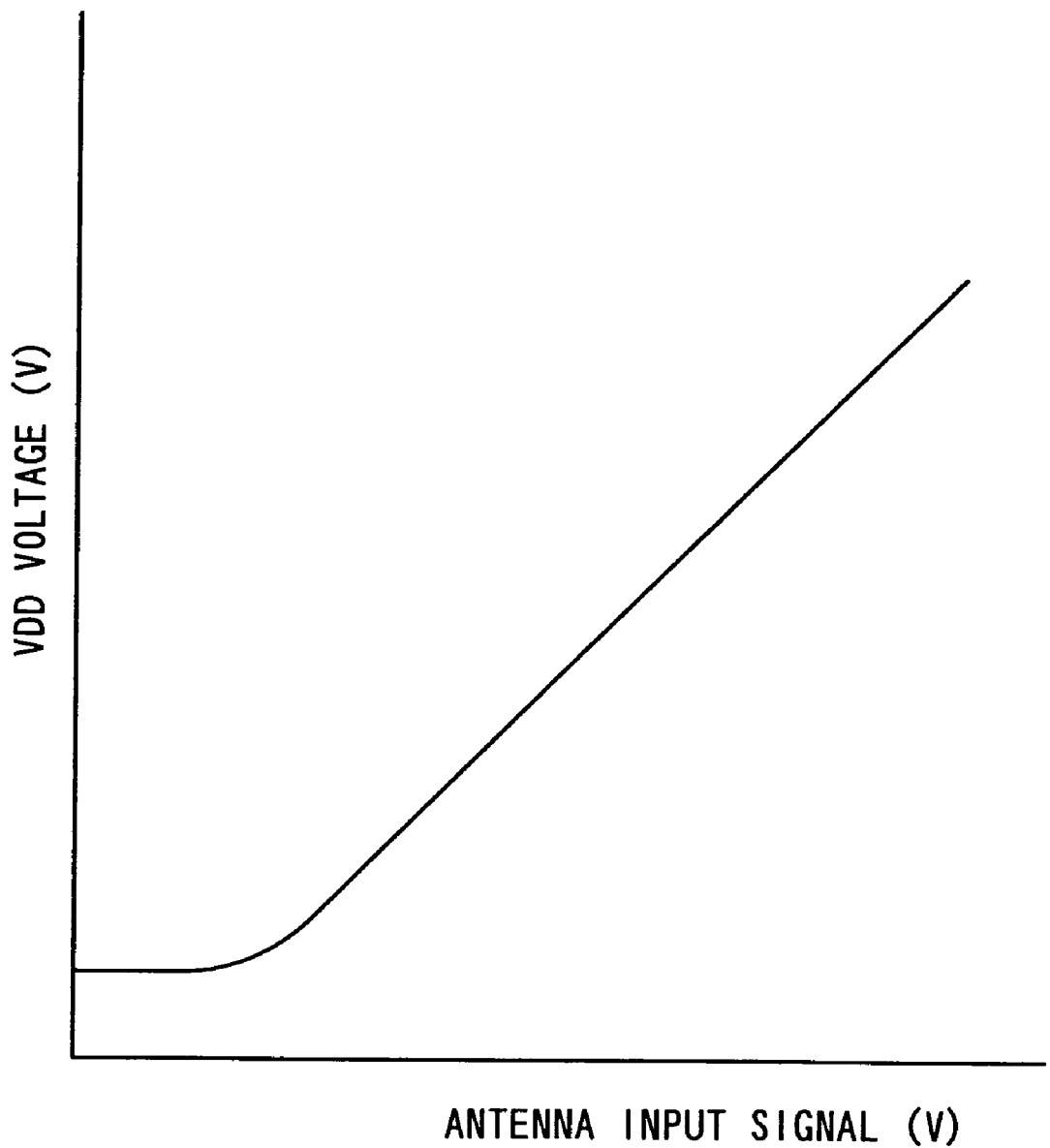
FIG. 12 is a diagram illustrating a relationship of the intensity of an input signal and the intensity of an output signal of a power supply circuit in a conventional RFID chip.

Then, as shown in FIG. 10B, the double-stick tape 4004 and the second substrate 4006 are peeled off from the protective layer 4003, and the protective layer 4003 is removed, whereby transfer to the flexible substrate can be carried out.

Note that the peeling of the semiconductor elements can be carried out by various methods such that: an amorphous silicon film containing hydrogen is provided between a highly heat-resistant substrate and semiconductor elements, and the amorphous silicon film is removed by laser irradiation or etching to remove the substrate; or highly heat-resistant substrate over which semiconductor elements are formed is removed mechanically or by etching with a solution or gas.

This embodiment can be appropriately implemented in combination with embodiment mode.

Embodiment 4

In this embodiment, description is made on an example where an antenna is externally attached to a circuit to which the invention is applied with reference to FIGS. 13A to 13E and FIG. 14.

Figure 13A:
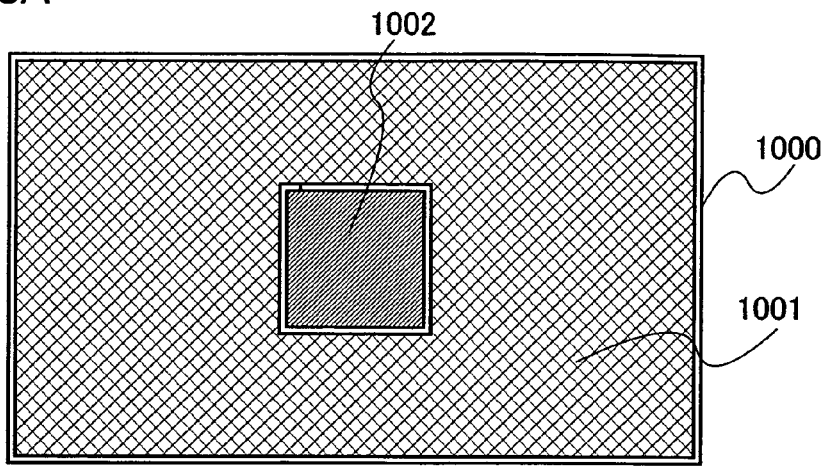
FIGS. 13A to 13E are diagrams illustrating an embodiment (various shapes of an antenna) of the invention.

FIG. 13A illustrates a structure of an RFID chip in which an antenna is formed on the periphery of a circuit. An antenna 1001 is formed on a circuit 1000 and connected to a circuit portion 1002 to which the invention is applied. FIG. 13A shows the structure in which the circuit portion 1002 is surrounded by the antenna 1001, however, another structure can be employed in which the whole surface of the substrate 1000 is covered with the antenna 1001 and the circuit portion 1002 having an electrode is attached thereto.

Figure 13B:
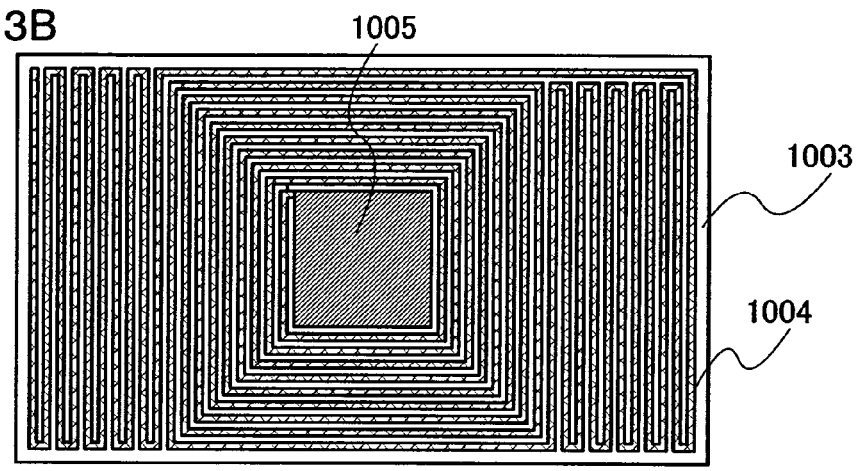

FIG. 13B illustrates an example where a circuit portion is surrounded by a thin antenna. An antenna 1004 is formed on a substrate 1003, and a circuit portion 1005 to which the invention is applied is connected thereto. Note that the shown antenna wiring is only an example, and the invention is not limited to this.

Figure 13C:
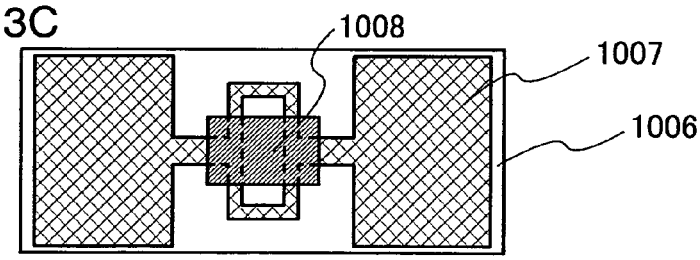

FIG. 13C illustrates an RF antenna. An antenna 1007 is formed on a substrate 1006, and a circuit portion 1008 to which the invention is applied is connected thereto.

Figure 13D:
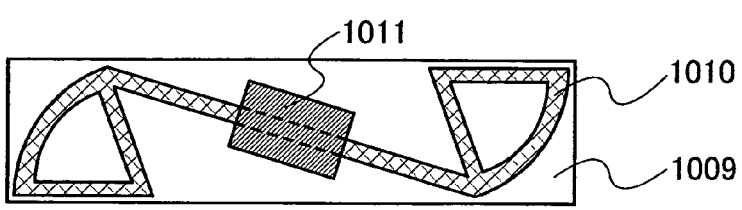

FIG. 13D illustrates an omnidirectional antenna (an antenna system which can receive radio waves uniformly from all directions). An antenna 1010 is formed on a substrate 1009, and a circuit portion 1011 to which the invention is applied is connected thereto.

Figure 13E:
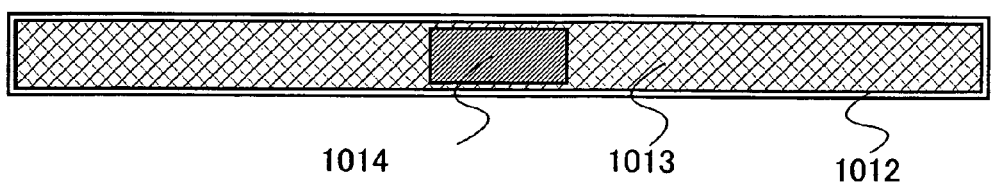

FIG. 13E illustrates a bar antenna. An antenna 1013 is formed on a substrate 1012, and a circuit portion 1014 to which the invention is applied is connected thereto.

The circuit portion to which the invention is applied and the antenna can be connected by known methods. For example, wire bonding or bump bonding may be employed to connect the antenna and the circuit. Alternatively, one face of the circuit portion (i.e., IC chip) may be used as an electrode to be attached to the antenna. In such a method, an ACF (anisotropic conductive film) may be employed for attachment.

The length of the antenna is required to be determined appropriately according to the frequencies used for data reception. In general, 1/integer of a wavelength is required. For example, in the case of the frequency being 2.45 GHz, the antenna may have a length of approximately 60 mm (½ wavelength) or 30 mm (¼ wavelength).

Figure 14A:
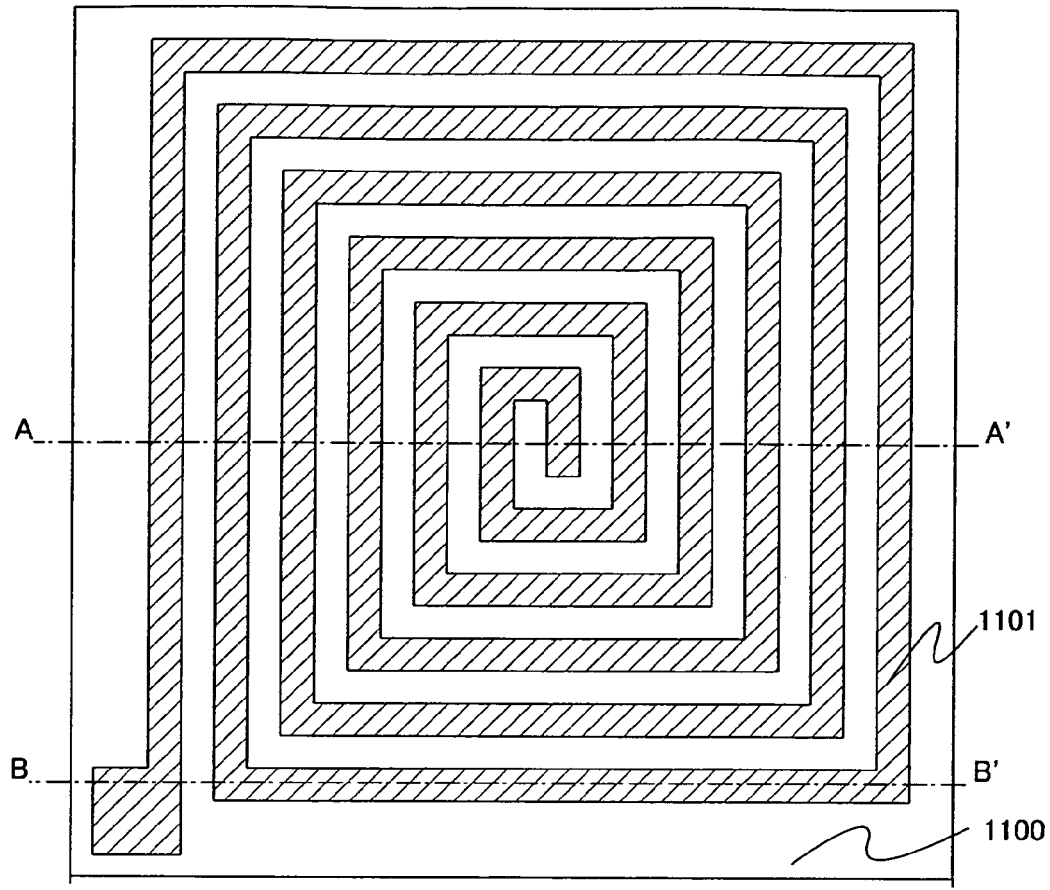
FIGS. 14A to 14C are diagrams illustrating an embodiment (an antenna disposed on a circuit) of the invention.
Figure 14B:
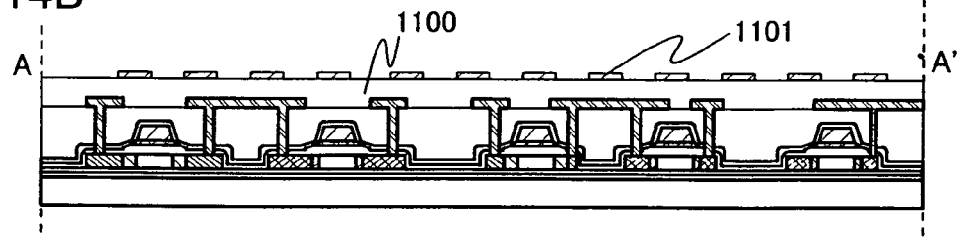
Figure 14C:
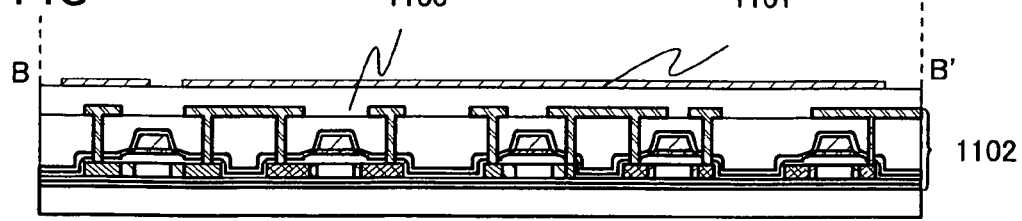

Alternatively, as shown in FIG. 14, a circuit portion 1102 and a spiral antenna wiring 1101 may be formed on a substrate 1100. Note that FIG. 14A is a top plan view of an RFID chip, FIG. 14B is a cross-sectional view along a line A-A' of FIG. 14A and FIG. 14C is a cross-sectional view along a line B-B' of FIG. 14A.

Note that shown in this embodiment are only examples, and the invention is not limited to such shapes of the antenna. The invention can be applied to antennas of various shapes.

This embodiment can be appropriately implemented in combination with any one of embodiment mode and Embodiment 2 or 3.

Embodiment 5

In this embodiment, description is made on applications of an IC card, an ID tag and an ID chip of the invention with reference to FIGS. 15A to 15H.

Figure 15A:
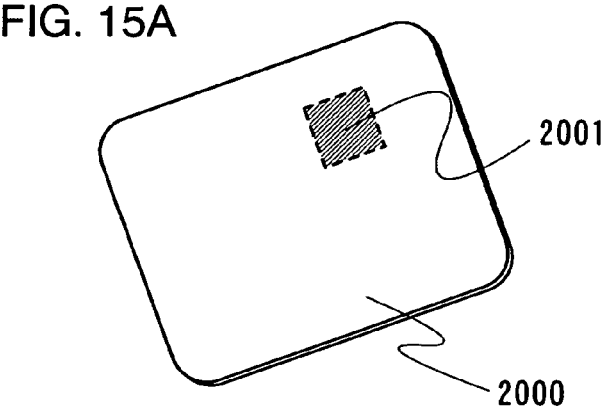
FIGS. 15A to 15H are views illustrating an embodiment (application of an RFID chip) of the invention.

FIG. 15A illustrates an IC card which can be used for personal identification as well as a credit card or an e-cash which enables cashless electronic payment by utilizing a rewritable memory in an incorporated circuit. A circuit portion 2001 to which the invention is applied is incorporated in an IC card 2000.

Figure 15B:
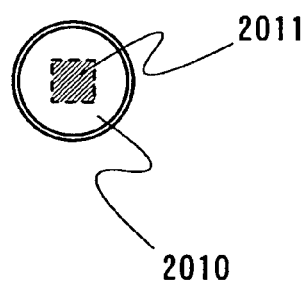

FIG. 15B illustrates an ID tag which can be used for personal identification as well as a close-leaving managerial system in specific places since it can be formed in compact size. FIG. 15B is an RFID tag in which a circuit portion 2011 to which the invention is applied is incorporated in an ID tag 2010.

Figure 15C:
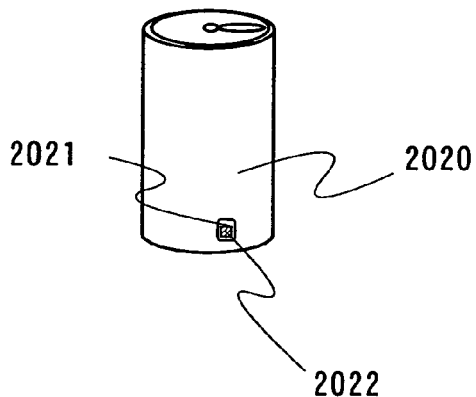

FIG. 15C illustrates an RFID chip 2022 attached to a product 2020 for merchandise management in retail shops such as supermarkets. The invention can be applied to a circuit in the RFID chip 2022. In this manner, the use of the RFID chip allows stock management as well as prevention of shoplifting and the like. In the shown figure, a protective film 2021 is used, which serves to protect as well as attach the RFID chip 2022 so that it is not peeled off, however, another structure may be employed in which the RFID chip 2022 is directly attached with an adhesive. In addition, the flexible substrate illustrated in Embodiment 3 is preferably employed in view of the structure of the RFID chip 2022 to be attached to a product.

Figure 15D:
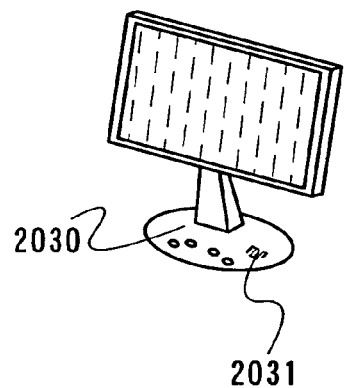

FIG. 15D illustrates an example where an RFID chip is incorporated in a product during manufacture. In the shown figure, an RFID chip 2031 is incorporated in a housing 2030 of a display. The invention can be applied to a circuit in the RFID chip 2031. According to such structure, verification of manufacturers, distribution management and the like can be carried out easily. Note that shown here is the example of a housing of a display, however, the invention is not limited to this and can be applied to various objects.

Figure 15E:
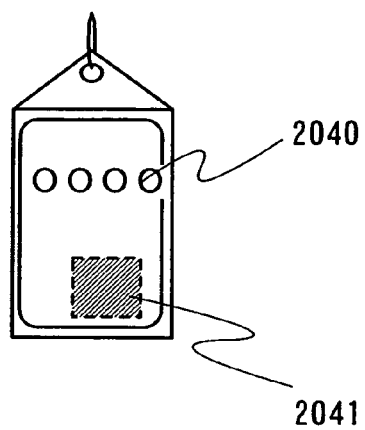

FIG. 15E illustrates a shipping tag for transportation of a product. In the shown figure, an RFID chip 2041 is incorporated in a shipping tag 2040. The invention is applied to a circuit in the RFID chip 2041. According to such structure, sorting of destinations to which products are transported, distribution management and the like can be carried out easily. Note that shown here is the structure in which a shipping tag is tied to a string fastened on a product, however, the invention is not limited to this, and another structure may be employed in which the tag is attached to the product with a sealing member and the like.

Figure 15F:
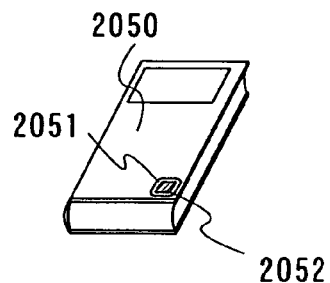

FIG. 15F illustrates an example where an RFID chip 2052 is incorporated in a book 2050. The invention is applied to a circuit in the RFID chip 2052. According to such structure, distribution management in bookstores, circulation management in libraries and the like can be carried out easily. In the shown figure, a protective film 2051 is used, which serves to protect as well as attach the RFID chip 2052 so that it is not peeled off, however, another structure may be employed in which the RFID chip 2052 is directly attached with an adhesive or embedded in the front cover of the book 2050.

Figure 15G:
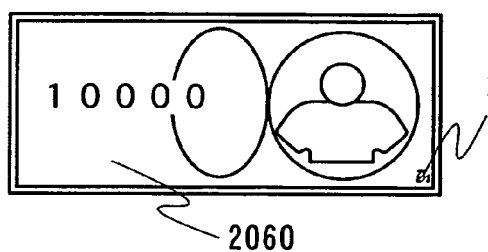

FIG. 15G illustrates an example where an RFID chip 2061 is embedded in a bill 2060. The invention can be applied to a circuit in the RFID chip 2061. According to such structure, distribution of bogus bills can be prevented. Note that the RFID chip 2061 is preferably embedded in the bill 2060 in order not to be peeled off in view of the properties of bills.

Figure 15H:
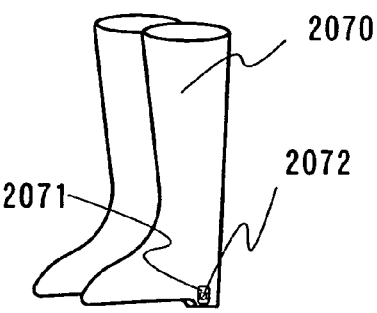

FIG. 15H illustrates an example where an RFID chip 2072 is embedded in a shoe 2070. The invention can be applied to a circuit in the RFID chip 2072. According to such structure, verification of manufacturers, distribution management and the like can be carried out easily. In the shown figure, a protective film 2071 is used, which serves to protect as well as attach the RFID chip 2072 so that it is not peeled off, however, another structure may be employed in which the RFID chip 2072 is directly attached with an adhesive or embedded in the shoe 2070.

Note that shown in this embodiment are only examples, and the invention is not limited to them.

This embodiment can be appropriately implemented in combination with any one of embodiment mode and Embodiments 2 to 4.

Embodiment 6

In this embodiment, description is made on the method of connection between a circuit portion and an antenna wiring of the RFID chip of the invention.

Figure 17A:
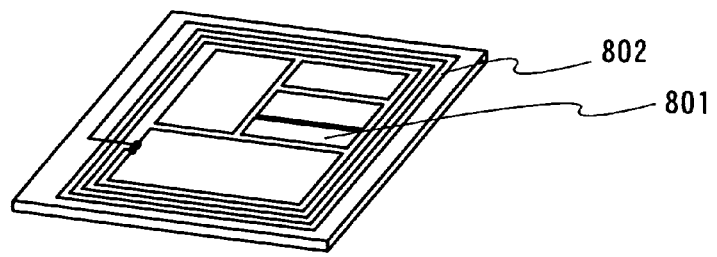
FIGS. 17A to 17C are views illustrating a mode of an RFID chip of the invention.

FIG. 17A illustrates an RFID chip in which a circuit portion 801 and an antenna wiring 802 are formed integrally. In the case of FIG. 17A, manufacturing steps of the circuit portion 801 and the antenna wiring 802 can be simplified, and attaching can be carried out only in one time.

Figure 17B:
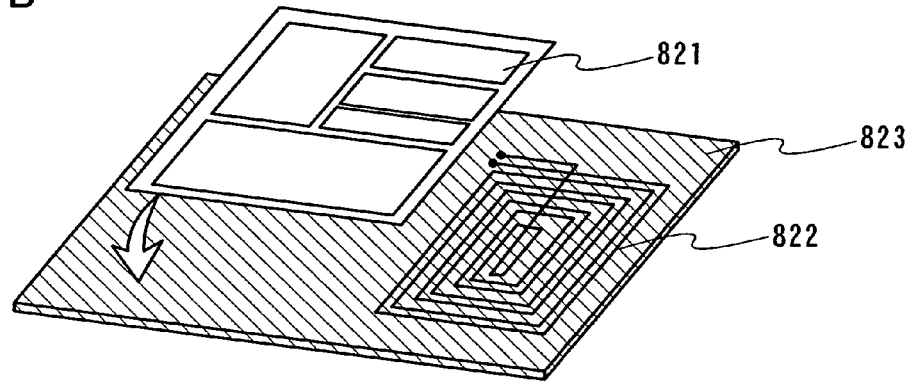

FIG. 17B illustrates a view in which an antenna wiring 822 is formed on a support base 823 in advance. The antenna wiring 822 may be, after being formed separately, attached to the support base 823, or formed on the support base 823 by direct printing, liquid droplet ejection, vapor deposition, photolithography and the like. Then, a circuit portion 821 is attached onto the support base 823 on which the antenna wiring 822 is formed. Note that the circuit portion 821 may be attached to be aligned with the antenna wiring 822 or to be overlapped with the antenna wiring 822.

Figure 17C:
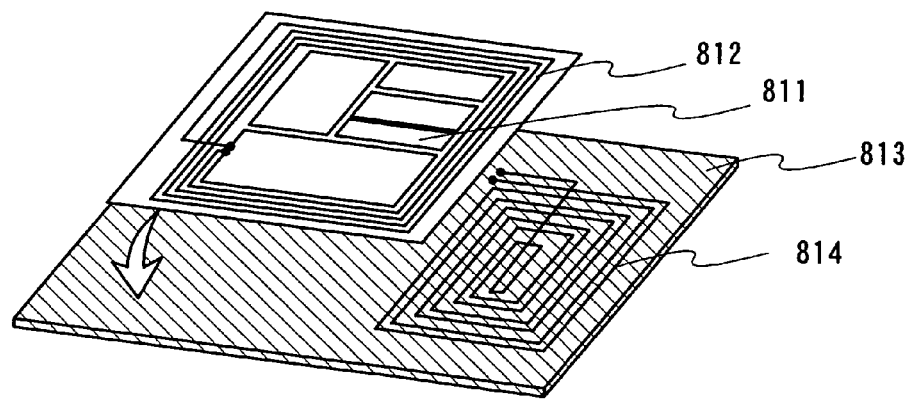

FIG. 17C illustrates a view in which a circuit portion 811 and an antenna wiring 812 which are formed together are attached to an antenna wiring 814 formed in advance on a support base 813. Note that the antenna wiring 814 may be, after being formed separately, attached to the support base 813, or alternatively formed on the support base 813 by a printing method typified by screen printing or offset printing, liquid droplet ejection, vapor deposition, photolithography and the like.

Note that in the case of using a flexible support base, an RFID chip can be formed in such a manner that an antenna wiring or a circuit is surrounded or sandwiched by the support base. Description is made now on the structure of an RFID chip formed by using a folded support base.

Figure 18:
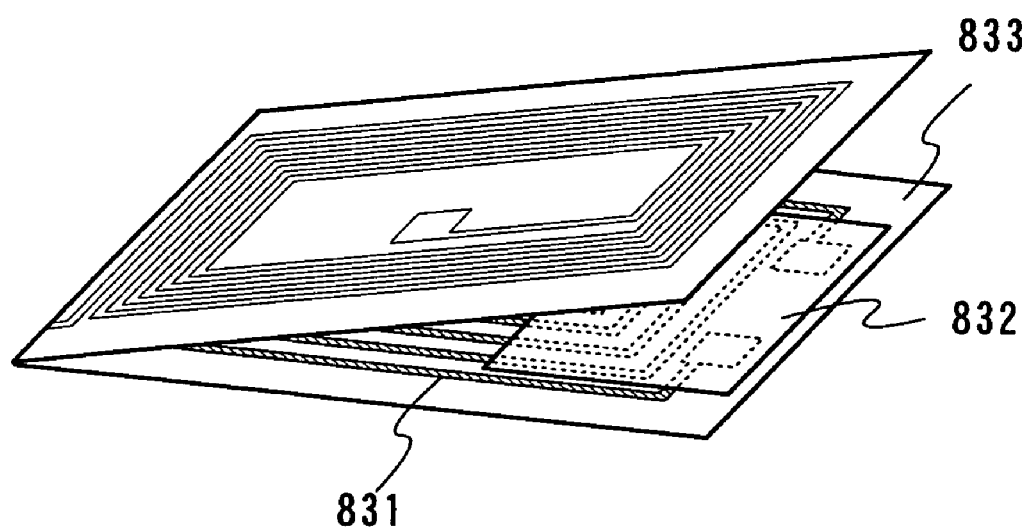
FIG. 18 is a view illustrating a mode of an RFID chip of the invention.

FIG. 18 illustrates a view of a flexible support base 833, on which an antenna wiring 831 and a circuit portion 832 are formed, being folded to sandwich the antenna wiring 831 and the circuit portion 832 inside. According to such structure, the antenna wiring 831 and the circuit portion 832 can be formed so as not to be exposed to the outside, therefore, mechanical strength of the RFID chip can be enhanced.

Note that the antenna wiring 831 and the circuit portion 832 may be covered with an insulating resin and the like so as not to contact the overlapped portions of the antenna wiring 831.

FIG. 18 illustrates the case where one side of an RFID chip is closed by folding a support base, however, the invention is not limited to such structure. An RFID chip of the invention may have a structure in which two sides of a support base are closed or three sides thereof are closed in bursiform. Alternatively, all of the four sides of the support base may be closed after the attachment of a circuit to the support base.

Embodiment 7

In this embodiment, description is made on the manufacturing method of a circuit portion which is incorporated in an ID chip of the invention, in particular a peeling step which is different from the aforementioned embodiment.

Figure 19A:
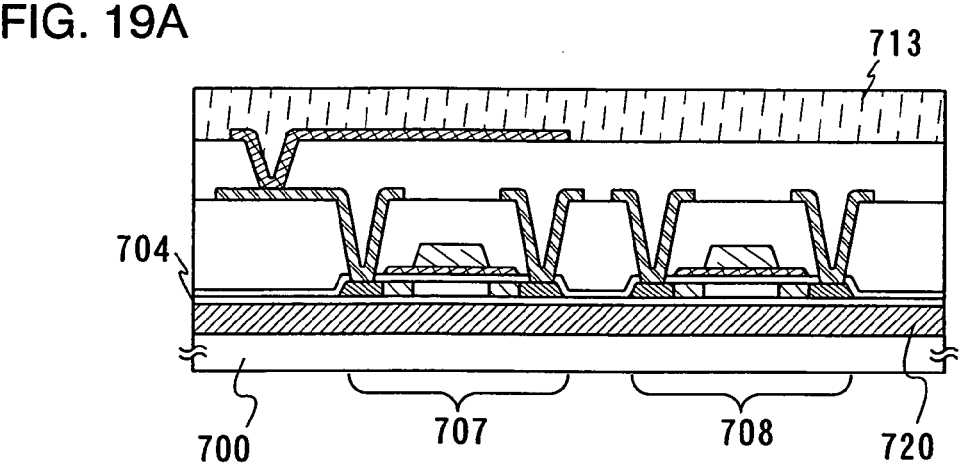
FIGS. 19A to 19D are diagrams illustrating an embodiment (transfer of TFTs to a film substrate) of the invention.

As shown in FIG. 19A, a peeling layer 720 and a base film 704 and are formed in this order over a substrate 700. On the base film 704, semiconductor elements of a circuit (TFTs 707 and 708 here) are formed.

The substrate 700 may be a glass substrate, a quartz substrate, a substrate formed of an insulating material such as alumina, a silicon wafer substrate, a plastic substrate having heat resistance to the subsequent steps or the like. In this case, a base insulating film for preventing diffusion of impurities and the like from a substrate side may be formed such as a silicon oxide ($SiO_x$) film, a silicon nitride ($SiN_x$) film, a silicon oxynitride ($SiO_xN_y$) (x>y) film and a silicon nitride oxide ($SiN_xO_y$) (x>y) film. Alternatively, a metal (e.g., stainless) substrate or a semiconductor substrate over the surface of which is formed of an insulating film such as a silicon oxide film or a silicon nitride film can be used.

The peeling layer is a layer provided between the substrate and the semiconductor elements. The substrate and the semiconductor elements can be isolated by removing the peeling layer later. As the peeling layer, a layer containing silicon as a main component can be used such as an amorphous silicon layer, a polycrystalline silicon (Si) layer, a single crystalline silicon layer and an SAS (semiamorphous silicon; also referred to as microcrystalline silicon) layer.

Fluorine halide such as $ClF_3$ (chlorine trifluoride) has a property of selectively etching silicon, therefore, the use of a gas or solution containing $ClF_3$ allows a peeling layer to be removed easily when the peeling layer contains silicon as its main component.

The base film is provided between the peeling layer and the semiconductor elements, and has a function to protect semiconductor elements from being etched by fluorine halide such as $ClF_3$. While fluorine halide such as $ClF_3$ has a property of selectively etching silicon, it does not etch silicon oxide ($SiO_x$), silicon nitride ($SiN_x$), silicon oxynitride ($SiO_xN_y$) and silicon nitride oxide ($SiN_xO_y$) almost at all. Therefore, while the peeling layer is etched with time, the base film which is formed of silicon oxide, silicon nitride, silicon oxynitride or silicon nitride oxide is not etched almost at all, which can prevent damage to the semiconductor elements.

Note that combination of the peeling layer and the base film is not limited to the aforementioned materials as long as the peeling layer is formed of materials which are etched by fluorine such as $ClF_3$ while the base film is formed of materials which are not etched, and thus the combination can be determined appropriately.

Figure 19B:
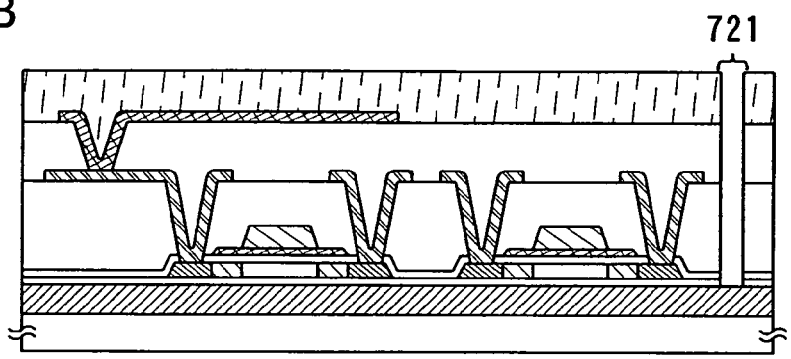

As shown in FIG. 19B, a trench 721 is formed on the boundary of the circuit portion.

The trench 721 on the boundary of the circuit portion can be formed by dicing, scribing, etching with a mask and the like. In the case of dicing, blade dicing using a dicing system (dicer) is typically employed. A blade is a grinding stone in which diamond particles are embedded, and has a width of approximately 30 to 50 μm. By spinning the blade at fast speed, adjacent circuit portions are isolated. In the case of scribing, diamond scribing, laser scribing and the like can be employed. In the case of etching, isolation can be carried out by dry etching, wet etching and the like after the formation of a mask pattern through exposure and development steps. As for the dry etching, atmospheric pressure plasma may be utilized.

Figure 19C:
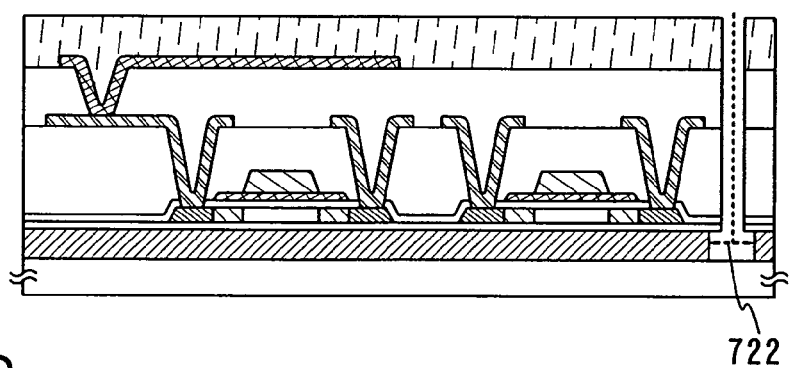

As shown in FIG. 19C, a gas/solution 722 containing fluorine halide is introduced into the trench 721 to remove the peeling layer.

As for the fluorine halide, a mixed gas of nitrogen and the aforementioned $ClF_3$ and the like may also be used. $ClF_3$ can be a solution depending on temperatures of the reaction space (boiling point: 11.75° C.), in which case wet etching can be employed as well. Note that $ClF_3$ can be formed by reacting chrorine with fluorine at a temperature of 200° C. or more through the process of $Cl_2(g)+3F_2(g) \rightarrow 2ClF_3(g)$. Note that the gas/solution 722 is not limited to $ClF_3$ or fluorine halide as long as being an etchant which etches the peeling layer but not etch the base film.

Figure 19D:
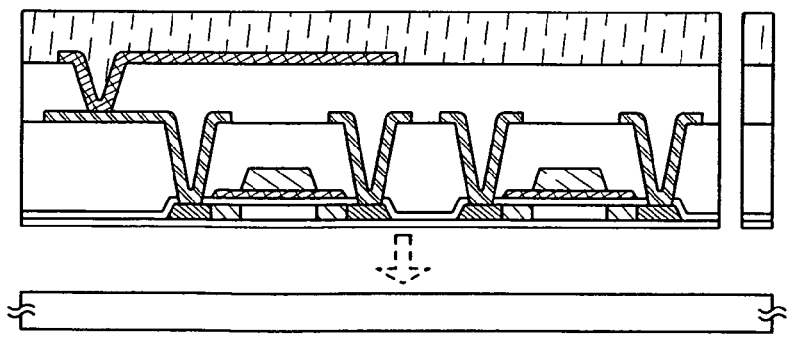

After that, as shown in FIG. 19D, the peeling layer is etched with time, and finally, the substrate 700 can be peeled off. On the other hand, the base film formed of silicon oxide, silicon nitride, silicon oxynitride, silicon nitride oxide or the like, the base film formed of a heat-resistant resin and the interlayer insulating film are not etched almost at all, therefore, damage to the semiconductor elements can be prevented. Note that the peeled substrate 700 can be reutilized which leads to cost reduction. In the case of reutilizing the substrate, it is desirable to control so that the substrate is not damaged by the dicing, scribing and the like. However, even in the case where the substrate is damaged, it may be compensated through planarizing steps by depositing an organic or inorganic resin film by coating or liquid droplet ejection (e.g., ink-jet printing).

Note that in order to protect the semiconductor elements from being etched by fluorine halide and the like, a protective layer 713 is preferably formed over the semiconductor elements. In particular, in the case of applying etching by heating a fluorine halide gas like low-pressure CVD, a heat-resistant organic or inorganic resin film is desirably employed. As a specific example of the heat-resistant organic resin, there is a material so-called a siloxane resin which has an Si—O bond in its backbone structure and contains as a substituent at least hydrogen or one or more of fluorine, an alkyl group and an aromatic hydrocarbon.

In addition, in this embodiment, a jig may be formed above the plurality of semiconductor elements via an adhesive, and a gas or solution containing fluorine halide may be introduced into the trench.

The jig refers to a support base for temporarily fixing semiconductor elements so that the semiconductor elements are not isolated after removal of the peeling layer. The jig is formed per chip, per semiconductor element group constituted of semiconductor elements or per semiconductor element group in which a plurality of semiconductor elements are integrated in the horizontal direction or vertical direction. The jig is preferably formed to have a say tooth shape having projections in order to introduce a gas or solution containing fluorine halide later easily, however, a flat jig may be employed as well. As the jig, a glass substrate containing silicon oxide as a main component, a quartz substrate, a stainless (SUS) substrate or the like which is not damaged by fluorine halide can be employed, however, any other materials may be employed as long as they are not damaged by fluorine halide.

Between the jig and the semiconductor elements, an adhesive for temporary adhesion is provided. As the adhesive, materials whose adhesion is decreased or lost by UV light irradiation can be used. Alternatively, repealable and readherable adhesives may be used such as Post-it (Japanese registered trademark) produced by THREE M INNOVATIVE PROPERTIES and NOTESTIX (Japanese registered trademark) produced by MOORE BUSINESS FORMS INC. Needless to say, the invention is not limited to the aforementioned materials as long as the jig can be detached easily.

In addition, in this embodiment, a heat-resistant insulating film may be formed over the semiconductor elements, and trenches may be formed on the boundaries of a plurality of circuits.

As the heat-resistant insulating film, a heat-resistant organic resin such as a so-called siloxane resin which has an Si—O bond in its backbone structure and contains as a substituent at least hydrogen or one or more of fluorine, an alkyl group and an aromatic hydrocarbon can be used as well as a heat-resistant inorganic material.

According to the peeling method of this embodiment, a chemical method using fluorine halide is adopted when the circuit portions are isolated from the substrate on which the circuit portions are formed. Therefore, the peeling method of this embodiment is advantageous as its enables accurate isolation when comparing with a physical peeling method in which stress is put to the substrate on which a plurality of circuit portions are formed to physically isolate the circuit portions from the substrate.

Figure 20:
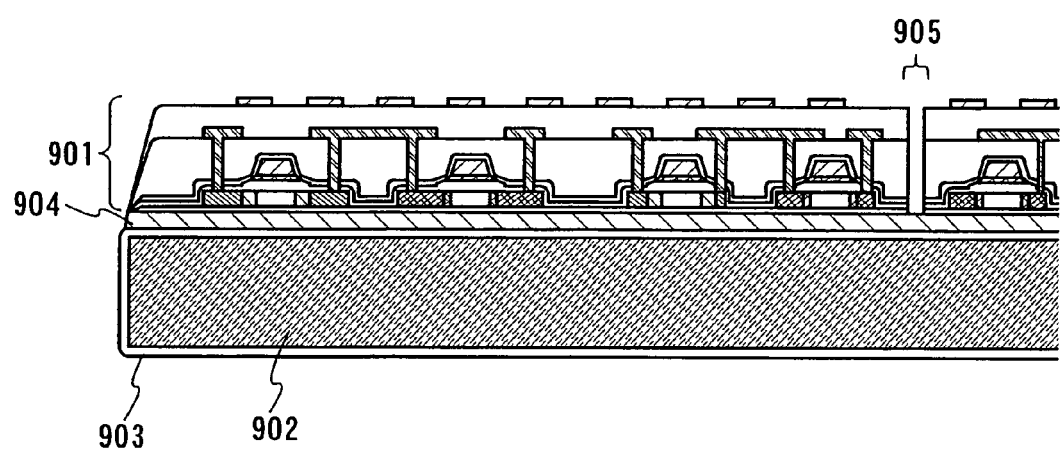
FIG. 20 is a diagram illustrating an embodiment (transfer of TFTs to a film substrate) of the invention.

As the substrate, a metal (e.g., stainless) substrate or a semiconductor substrate over the surface of which is formed an insulating film such as a silicon oxide film or a silicon nitride film can be used as described above. For example, a silicon oxide film formed covering an Si wafer can be used as a substrate. FIG. 20 illustrates a view in which a silicon oxide film 903 is formed so as to cover an Si wafer 902, and a peeling layer 904 and a circuit portion/antenna wiring 901 are formed in this order over the silicon oxide film 903. After the formation of the condition shown in FIG. 20, the circuit portion/antenna wiring 901 may be peeled off by removing the peeling layer 904 by etching and the like. Note that when the peeling is performed, a trench 905 can be formed by applying dicing, scribing or etching with a mask, and the like.

Alternatively, an Si wafer over which is formed a silicon oxide film and the like can be used as the substrate. In this case, the Si wafer is removed by etching with fluoride halogen such as $ClF_3$ (chlorine trifluoride). On the silicon oxide film, single crystalline silicon can be formed and thus transistors having single crystalline silicon can be formed.

Alternatively, an SIMOX substrate can be used, in which case isolation is carried out on the boundary of a silicon oxide layer formed inside of the SIMOX substrate.

In this manner, the use of the Si wafer enables microfabrication unlike the case of forming circuits on other substrates.

The circuit potions peeled in this manner can be transferred similarly to the aforementioned embodiment.

What is claimed is:

1. A semiconductor device comprising:
an antenna circuit;
a converter circuit which converts an AC voltage to a DC voltage through rectification;
a first comparator circuit;
a second comparator circuit
a first reference voltage source;
a second reference voltage source;
a first switch element electrically connected to the first comparator circuit and the ground;
a second switch element electrically connected to the second comparator circuit and the ground;
a first capacitor electrically connected to the antenna circuit and the first switch element; and
a second capacitor electrically connected to the antenna circuit and the second switch element,
wherein the antenna circuit is electrically connected to the converter circuit,
wherein the first comparator circuit compares an output voltage of the first reference voltage source with an output voltage of the converter circuit, and
wherein the second comparator circuit compares an output voltage of the second reference voltage source with the output voltage of the converter circuit.

2. The semiconductor device according to claim 1, wherein the antenna circuit, the converter circuit, the first comparator circuit, the second comparator circuit, the first capacitor, the second capacitor, the first switch element and the second switch element are integrally formed over the same insulating substrate.

3. The semiconductor device according to claim 2, wherein the insulating substrate is formed of glass, plastic or an insulating film.

4. The semiconductor device according to claim 1, wherein the converter circuit, the first comparator circuit, the second comparator circuit, the first capacitor, the second capacitor, the first switch element and the second switch element are integrally formed over the same insulating substrate, and the antenna circuit is formed on another substrate.

5. The semiconductor device according to claim 4, wherein the insulating substrate is formed of glass, plastic or an insulating film.

6. The semiconductor device according to claim 1, wherein at lest one of the converter circuit, the first comparator circuit, the second comparator circuit, the first switch element and the second switch element is formed of a thin film transistor.

7. The semiconductor device according to claim 1, wherein the antenna circuit is formed over the converter circuit, the first comparator circuit, the second comparator circuit, the first switch element or the second switch element.

8. The semiconductor device according to claim 1, wherein the antenna circuit is formed over a flexible support base, wherein the antenna circuit is surrounded or sandwiched by the flexible support base.

9. An IC card having the semiconductor device according to claim 1.

10. An RFID tag having the semiconductor device according to claim 1.

11. An RFID chip having the semiconductor device according to claim 1.

12. A semiconductor device comprising:
an antenna circuit;
a converter circuit which converts an AC voltage to a DC voltage through rectification;
a plurality of comparator circuits;
a plurality of reference voltage sources;
a plurality of switch elements each of which is electrically connected to respective one of the plurality of comparator circuits and the ground; and
a plurality of capacitors each of which is electrically connected to the antenna circuit and respective one of the plurality of switch elements,
wherein the antenna circuit is electrically connected to the converter circuit, and
wherein the plurality of comparator circuits compare output voltages of the plurality of reference voltage sources with an output voltage of the converter circuit, respectively.

13. The semiconductor device according to claim 12, wherein the antenna circuit, the converter circuit, the plurality of comparator circuits, the plurality of capacitors and the plurality of switch elements are integrally formed over the same insulating substrate.

14. The semiconductor device according to claim 13, wherein the insulating substrate is formed of glass, plastic or an insulating film.

15. The semiconductor device according to claim 12, wherein the converter circuit, the plurality of comparator circuits, the plurality of capacitors and the plurality of switch elements are integrally formed over the same insulating substrate, and the antenna circuit is formed on another substrate.

16. The semiconductor device according to claim 15, wherein the insulating substrate is formed of glass, plastic or an insulating film.

17. The semiconductor device according to claim 12, wherein at lest one of the converter circuit, the plurality of comparator circuits and the plurality of switch elements is formed of a thin film transistor.

18. The semiconductor device according to claim 12, wherein the antenna circuit is formed over the converter circuit, the plurality of comparator circuits or the plurality of switch elements.

19. The semiconductor device according to claim 12, wherein the antenna circuit is formed over a flexible support base, wherein the antenna circuit is surrounded or sandwiched by the flexible support base.

20. An IC card having the semiconductor device according to claim 2.

21. An RFID tag having the semiconductor device according to claim 12.

22. An RFID chip having the semiconductor device according to claim 12.

23. A semiconductor device comprising:
a first antenna circuit;
a second antenna circuit;
a first converter circuit which converts a first AC voltage to a first DC voltage through rectification;
a second converter circuit which converts a second AC voltage to a second DC voltage through rectification;
a comparator circuit;

a switch element electrically connected to the comparator circuit and the ground; and a capacitor electrically connected to the first antenna circuit and the switch element, wherein the first and the second antenna circuits are electrically connected to the first and the second converter circuits, respectively, and, wherein the comparator circuit compares an output voltage of the first converter circuit with an output voltage of the second converter circuit.

24. The semiconductor device according to claim 23, wherein the first and the second antenna circuits, the first and the second converter circuits, the comparator circuit, the capacitor, and the switch element are integrally formed over the same insulating substrate.

25. The semiconductor device according to claim 24, wherein the insulating substrate is formed of glass, plastic or an insulating film.

26. The semiconductor device according to claim 23, wherein the first and the second converter circuits, the comparator circuit, the capacitor and the switch element are integrally formed over the same insulating substrate, and the first and the second antenna circuits are formed on another substrate.

27. The semiconductor device according to claim 26, wherein the insulating substrate is formed of glass, plastic or an insulating film.

28. The semiconductor device according to claim 23, wherein at lest one of the first and the second converter circuits, the comparator circuit and the switch element is formed of a thin film transistor.

29. The semiconductor device according to claim 23, wherein the first and the second antenna circuits are formed over the first converter circuit, the second converter circuit, the comparator circuit or the switch element.

30. The semiconductor device according to claim 23, wherein the first and the second antenna circuits are formed over a flexible support base, wherein the first and the second antenna circuits are surrounded or sandwiched by the flexible support base.

31. An IC card having the semiconductor device according to claim 23.

32. An RFID tag having the semiconductor device according to claim 23.

33. An RFID chip having the semiconductor device according to claim 23.

34. A semiconductor device comprising:
an antenna circuit;
a converter circuit which converts an AC voltage to a DC voltage though rectification;
a first comparator circuit;
a second comparator circuit;
a first reference voltage source;
a second reference voltage source;
a first resistor;
a second resistor;
a first switch element electrically connected to the first comparator circuit and the ground; and
a second switch element electrically connected to the second comparator circuit and the ground; and
a first capacitor electrically connected to the antenna circuit and the first switch element,
a second capacitor electrically connected to the antenna circuit and the second switch element,
wherein the antenna circuit is electrically connected to the converter circuit,
wherein a first terminal of the first resistor is electrically connected to the converter circuit, a second terminal of the first resistor is electrically connected to a first terminal of the second resistor, and a second terminal of the second resistor is electrically connected to the ground, wherein the first comparator circuit compares an output voltage of the first reference voltage source with a voltage of the second terminal of the first resistor, and wherein the second comparator circuit compares an output voltage of the second reference voltage source with the voltage of the second terminal of the first resistor.

35. The semiconductor device according to claim 34, wherein the antenna circuit, the converter circuit, the first comparator circuit, the second comparator circuit, the first capacitor, the second capacitor, the first switch element and the second switch element are integrally formed over the same insulating substrate.

36. The semiconductor device according to claim 35, wherein the insulating substrate is formed of glass, plastic or an insulating film.

37. The semiconductor device according to claim 34, wherein the converter circuit, the first comparator circuit, the second comparator circuit, the first capacitor, the second capacitor, the first switch element and the second switch element are integrally formed over the same insulating substrate, and the antenna circuit is formed on another substrate.

38. The semiconductor device according to claim 37, wherein the insulating substrate is formed of glass, plastic or an insulating film.

39. The semiconductor device according to claim 34, wherein at lest one of the converter circuit, the first comparator circuit, the second comparator circuit, the first switch element and the second switch element is formed of a thin film transistor.

40. The semiconductor device according to claim 34, wherein the antenna circuit is formed over the converter circuit, the first comparator circuit, the second comparator circuit, the first switch element or the second switch element.

41. The semiconductor device according to claim 34, wherein the antenna circuit is formed over a flexible support base, wherein the antenna circuit is surrounded or sandwiched by the flexible support base.

42. An IC card having the semiconductor device according to claim 34.

43. An RFID tag having the semiconductor device according to claim 34.

44. An RFID chip having the semiconductor device according to claim 34.

45. A semiconductor device comprising:
an antenna circuit;
a converter circuit which converts an AC voltage to a DC voltage through rectification;
a plurality of comparator circuits;
a plurality of reference voltage sources;
a monitor circuit electrically connected to the converter circuit and the plurality of comparator circuits;
a plurality of switch elements each of which is electrically connected to respective one of the plurality of comparator circuits and the ground; and
a plurality of capacitors each of which is electrically connected to the antenna circuit and respective one of the plurality of switch elements,
wherein the antenna circuit is electrically connected to the converter circuit, and
wherein the plurality of comparator circuits compare output voltages of the plurality of reference voltage sources with an output voltage of the monitor circuit, respectively.

46. The semiconductor device according to claim 45, wherein the antenna circuit, the converter circuit, the plurality of comparator circuits, the plurality of capacitors and the plurality of switch elements are integrally formed over the same insulating substrate.

47. The semiconductor device according to claim 46, wherein the insulating substrate is formed of glass, plastic or an insulating film.

48. The semiconductor device according to claim 45, wherein the converter circuit, the plurality of comparator circuits, the plurality of capacitors and the plurality of switch elements are integrally formed over the same insulating substrate, and the antenna circuit is formed on another substrate.

49. The semiconductor device according to claim 48, wherein the insulating substrate is formed of glass, plastic or an insulating film.

50. The semiconductor device according to claim 45, wherein at lest one of the converter circuit, the plurality of comparator circuits and the plurality of switch elements is formed of a thin film transistor.

51. The semiconductor device according to claim 45, wherein the antenna circuit is formed over the converter circuit, the plurality of comparator circuits or the plurality of switch elements.

52. The semiconductor device according to claim 45, wherein the antenna circuit is formed over a flexible support base, wherein the antenna circuit is surrounded or sandwiched by the flexible support base.

53. An IC card having the semiconductor device according to claim 45.

54. An RFID tag having the semiconductor device according to claim 45.

55. An RFID chip having the semiconductor device according to claim 45.

56. A semiconductor device comprising:
   a first antenna circuit;
   a second antenna circuit;
   a first converter circuit which converts a first AC voltage to a first DC voltage through rectification;
   a second converter circuit which converts a second AC voltage to a second DC voltage though rectification;
   a comparator circuit;
   a first monitor circuit electrically connected to the first converter circuit and the comparator circuit;
   a second monitor circuit electrically connected to the second converter circuit and the comparator circuit;
   a switch element electrically connected to the comparator circuit and the ground; and
   a capacitor electrically connected to the first antenna circuit and the switch element,
   wherein the first and the second antenna circuits are electrically connected to the first and the second converter circuits, respectively, and,
   wherein the comparator circuit compares an output voltage of the first monitor circuit with an output voltage of the second monitor circuit.

57. The semiconductor device according to claim 56, wherein the first and the second antenna circuits, the first and the second converter circuits, the comparator circuit, the capacitor and the switch element are integrally formed over the same insulating substrate.

58. The semiconductor device according to claim 57, wherein the insulating substrate is formed of glass, plastic or an insulating film.

59. The semiconductor device according to claim 56, wherein the first and the second converter circuits, the comparator circuit, the capacitor and the switch element are integrally formed over the same insulating substrate, and the first and the second antenna circuits are formed on another substrate.

60. The semiconductor device according to claim 59, wherein the insulating substrate is formed of glass, plastic or an insulating film.

61. The semiconductor device according to claim 56, wherein at lest one of the first and the second converter circuits, the comparator circuit and the switch element is formed of a thin film transistor.

62. The semiconductor device according to claim 56, wherein the first and the second antenna circuits are formed over the first converter circuit, the second converter circuit, the comparator circuit or the switch element.

63. The semiconductor device according to claim 56, wherein the first and the second antenna circuits are formed over a flexible support base, wherein the first and the second antenna circuits are surrounded or sandwiched by the flexible support base.

64. An IC card having the semiconductor device according to claim 56.

65. an RFID tag having the semiconductor device according to claim 56.

66. An RFID chip having the semiconductor device according to claim 56.

67. A driving method of a semiconductor device, comprising the steps of:
   converting an AC voltage generated in an antenna circuit to a first DC voltage through rectification;
   comparing the first DC voltage with a first reference voltage;
   comparing the first DC voltage with a second reference voltage;
   connecting a first capacitor in parallel to the antenna circuit when the first DC voltage reaches higher than the first reference voltage;
   connecting a second capacitor in parallel to the antenna circuit when the first DC voltage reaches higher than the second reference voltage;
   attenuating the AC voltage generated in the antenna circuit; and
   converting the attenuated AC voltage to a DC voltage through rectification.

68. A driving method of a semiconductor device, comprising the steps of:
   converting an AC voltage generated in an antenna circuit to a first DC voltage through rectification;
   comparing the first DC voltage with a plurality of reference voltages;
   connecting a capacitor being corresponding to one of the plurality of reference voltages in parallel to the antenna circuit when the first DC voltage reaches higher than the one of the plurality of reference voltages;
   attenuating the AC voltage generated in the antenna circuit; and
   converting the attenuated AC voltage to a second DC voltage through rectification.

69. A driving method of a semiconductor device, comprising the steps of:
   converting an AC voltage generated in a first antenna circuit to a first DC voltage through rectification;
   converting an AC voltage generated in a second antenna circuit to a second DC voltage through rectification;
   comparing the first DC voltage with a the second DC voltage;
   connecting a capacitor in parallel to the first antenna circuit when the first DC voltage reaches higher than the second DC voltage;
   attenuating the AC voltage generated in the first antenna circuit; and
   converting the attenuated AC voltage to a third DC voltage through rectification.

* * * * *